United States Patent Office 3,315,776
Patented Apr. 25, 1967

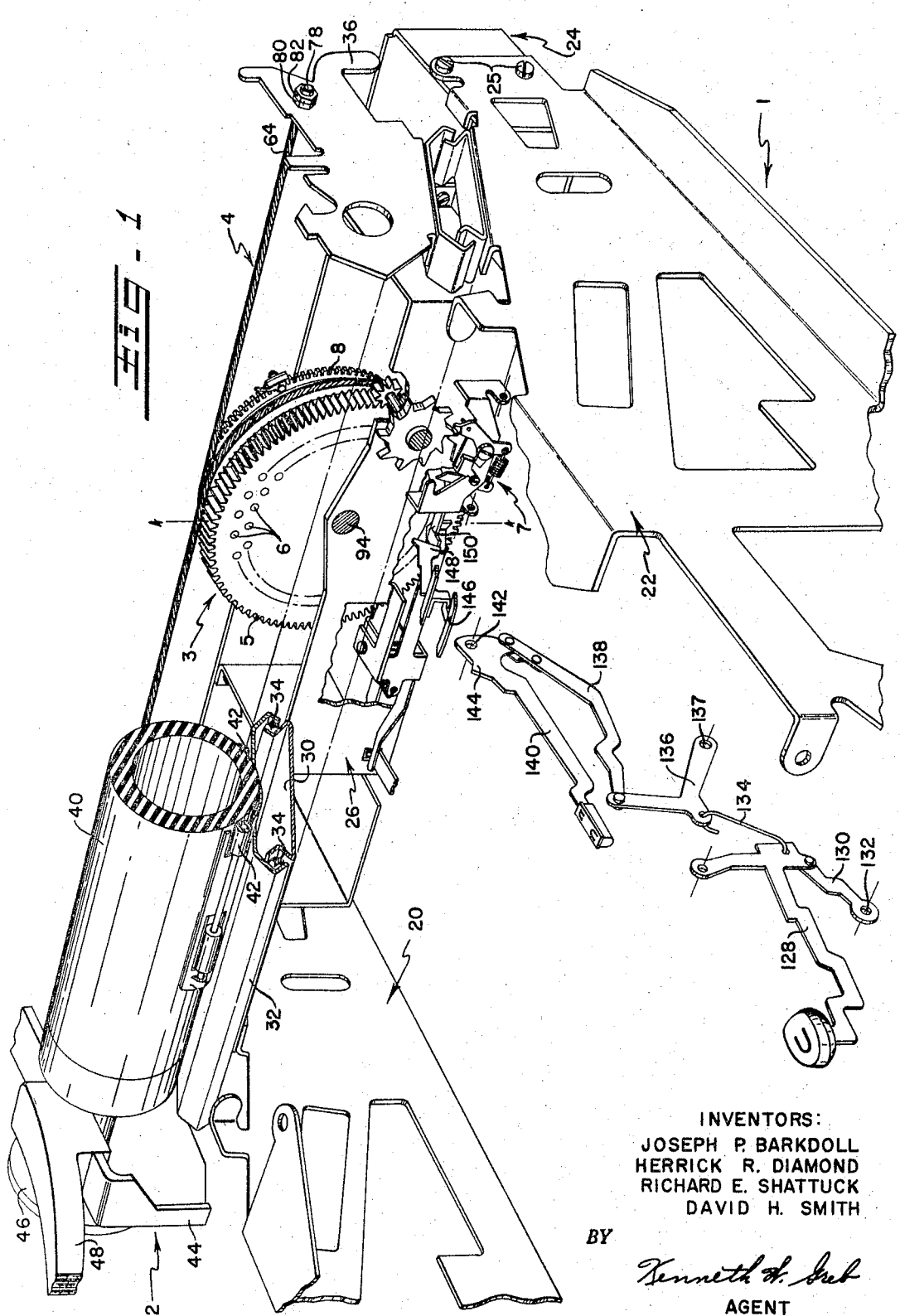

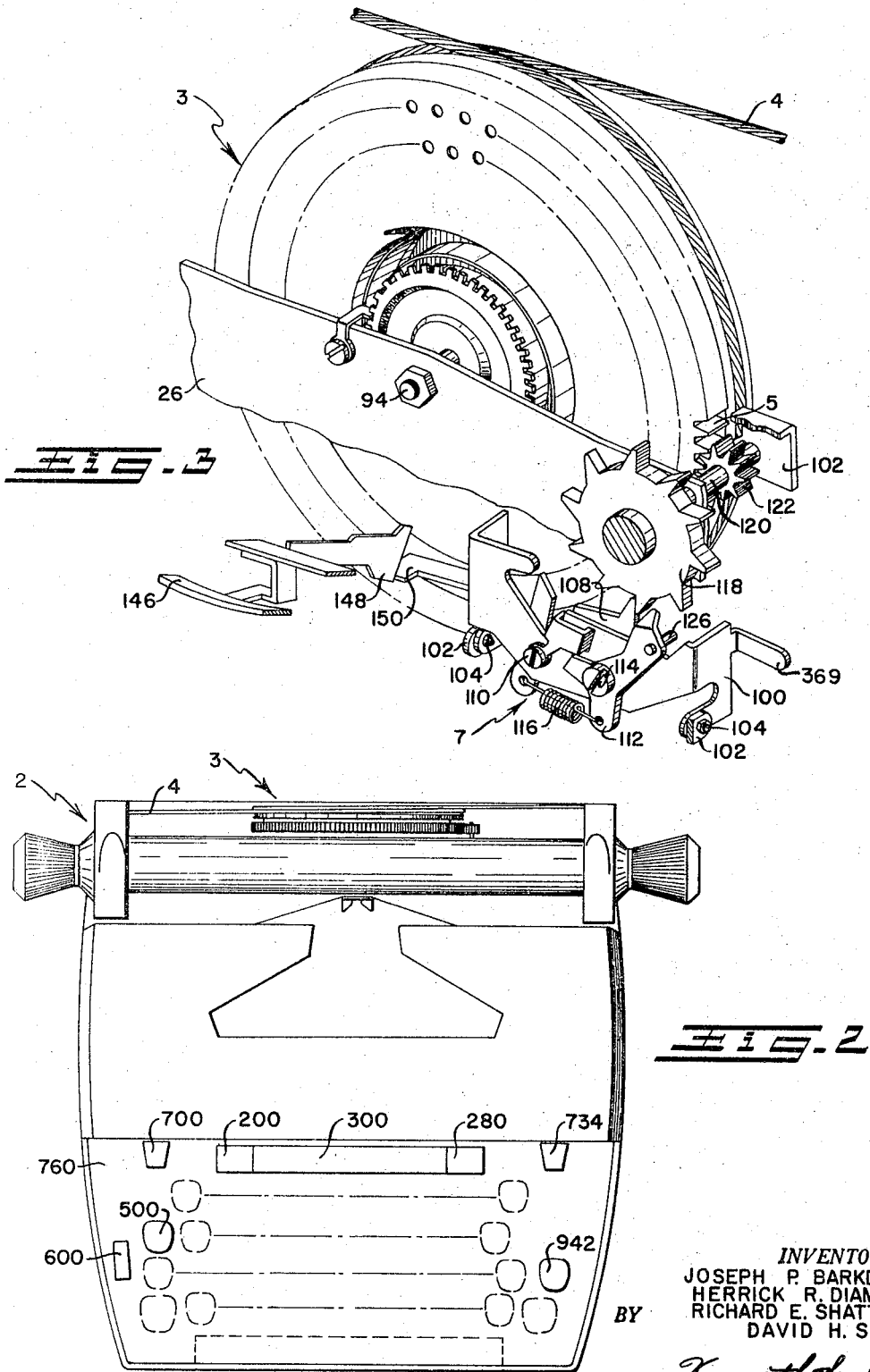

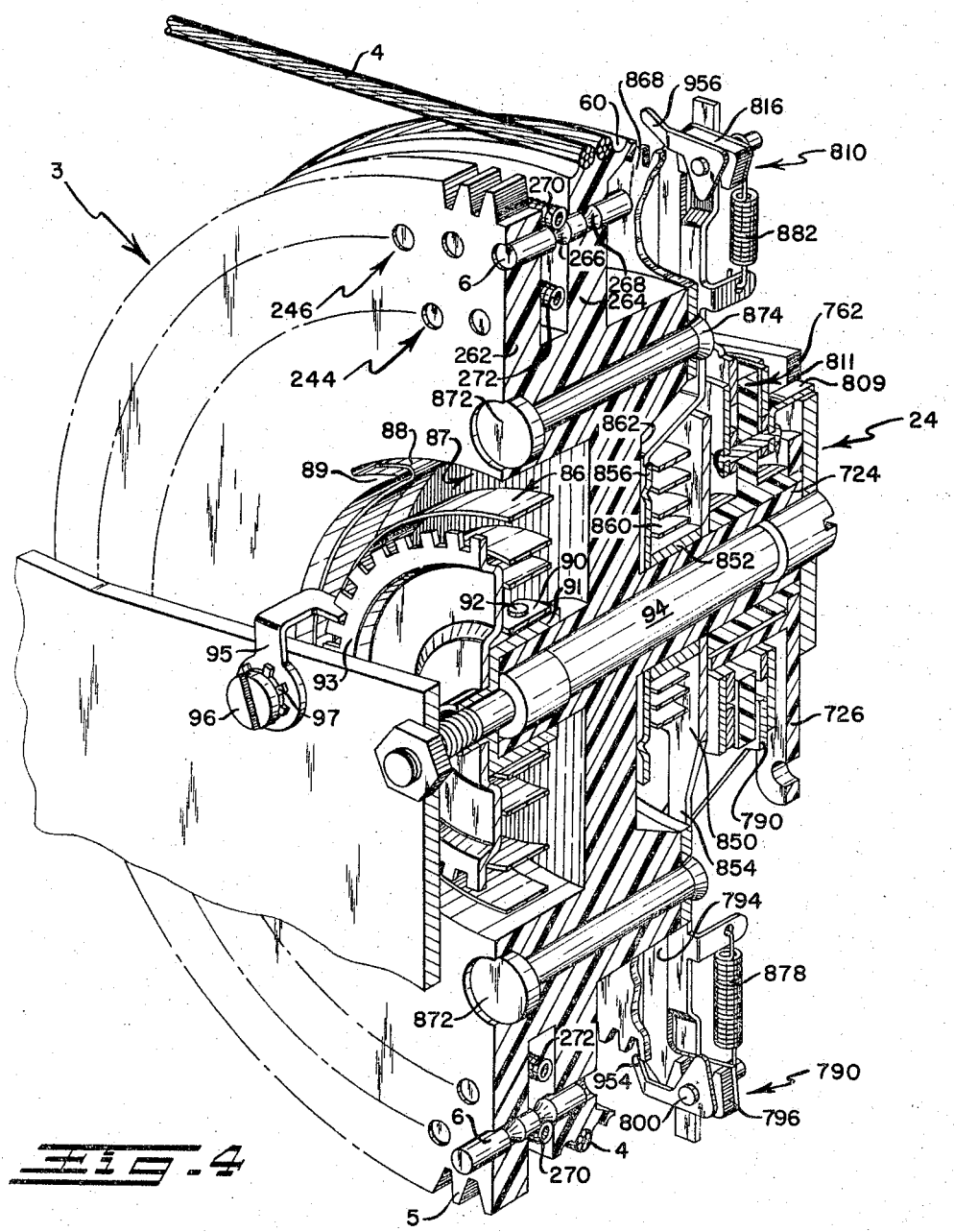

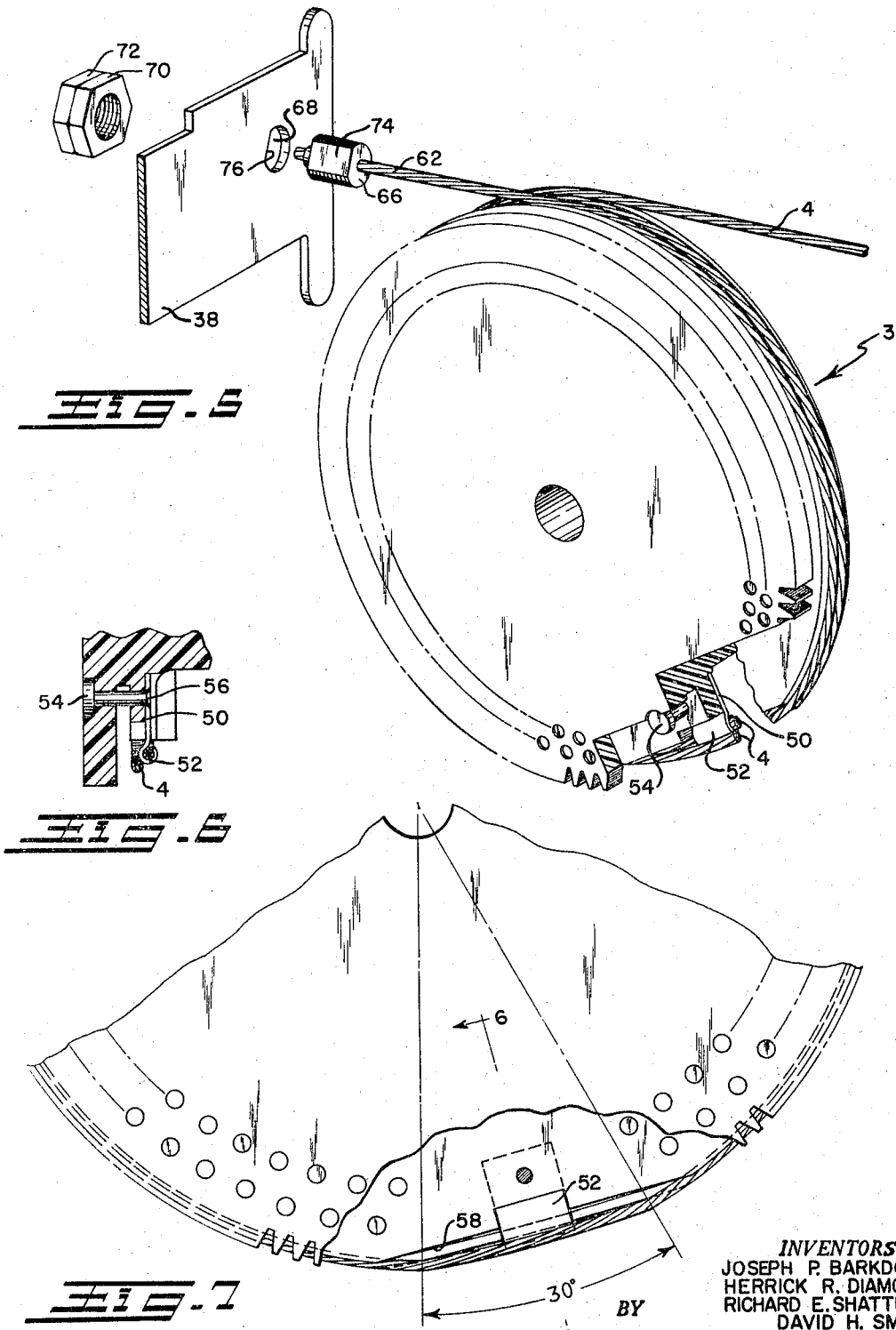

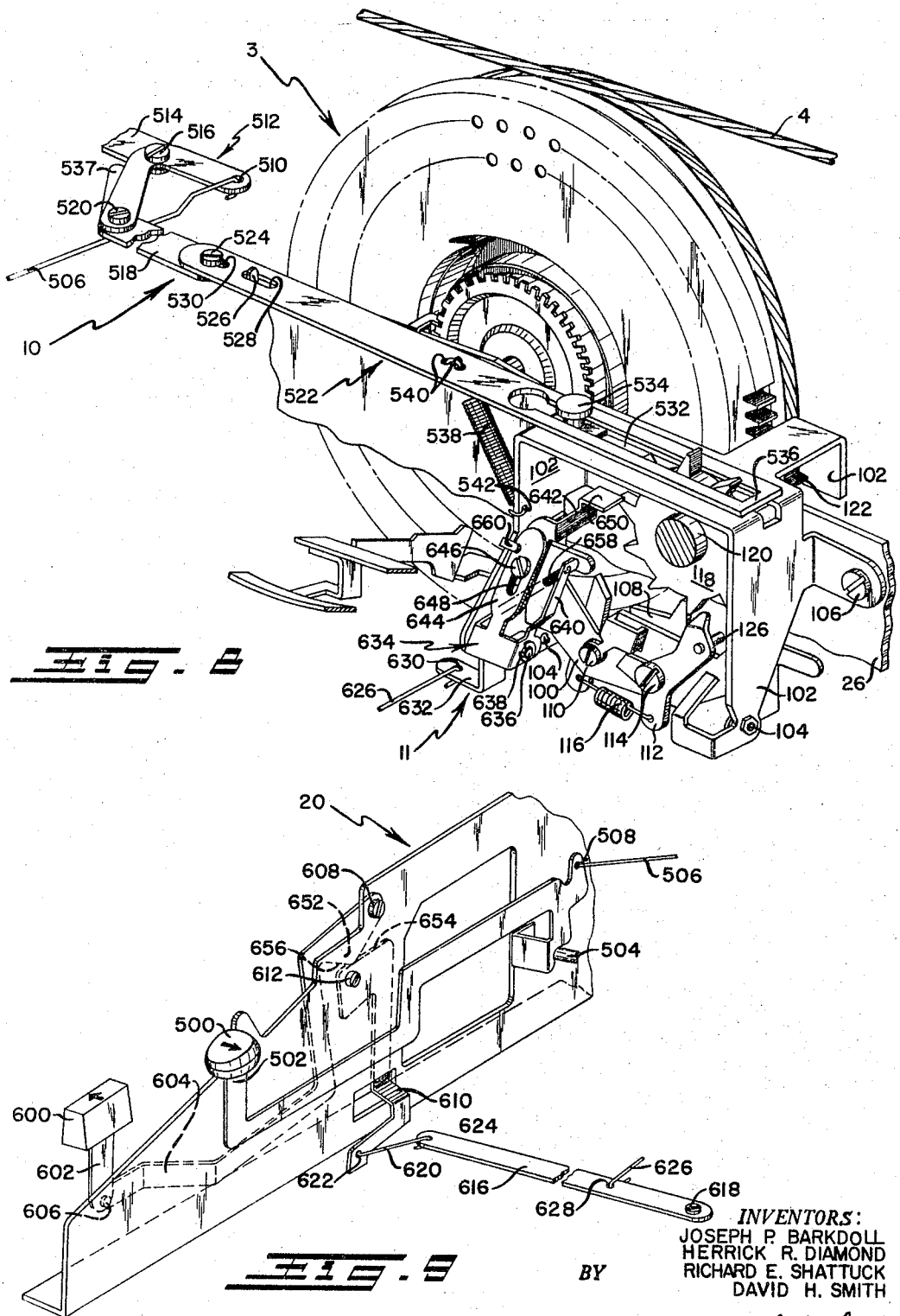

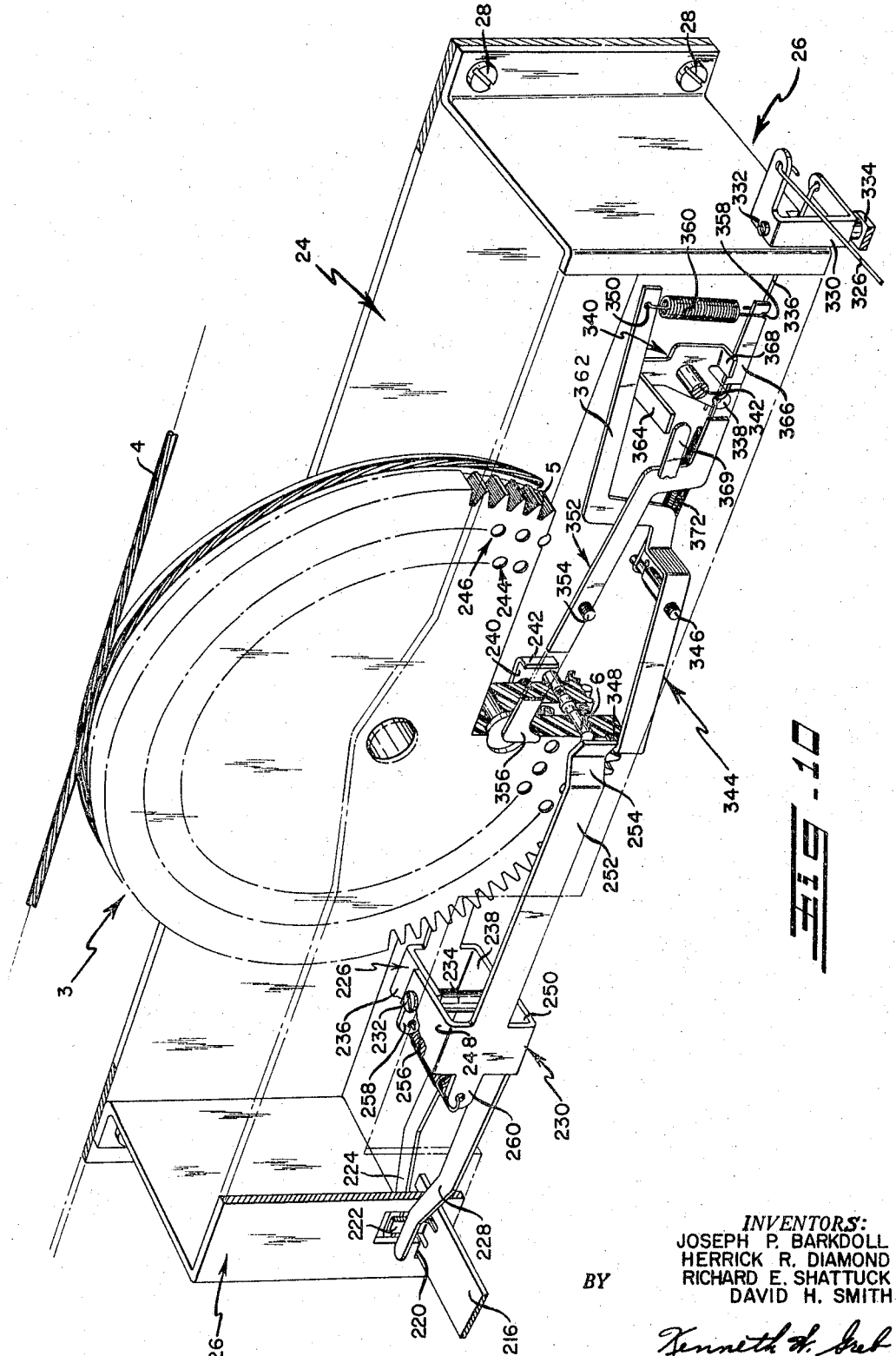

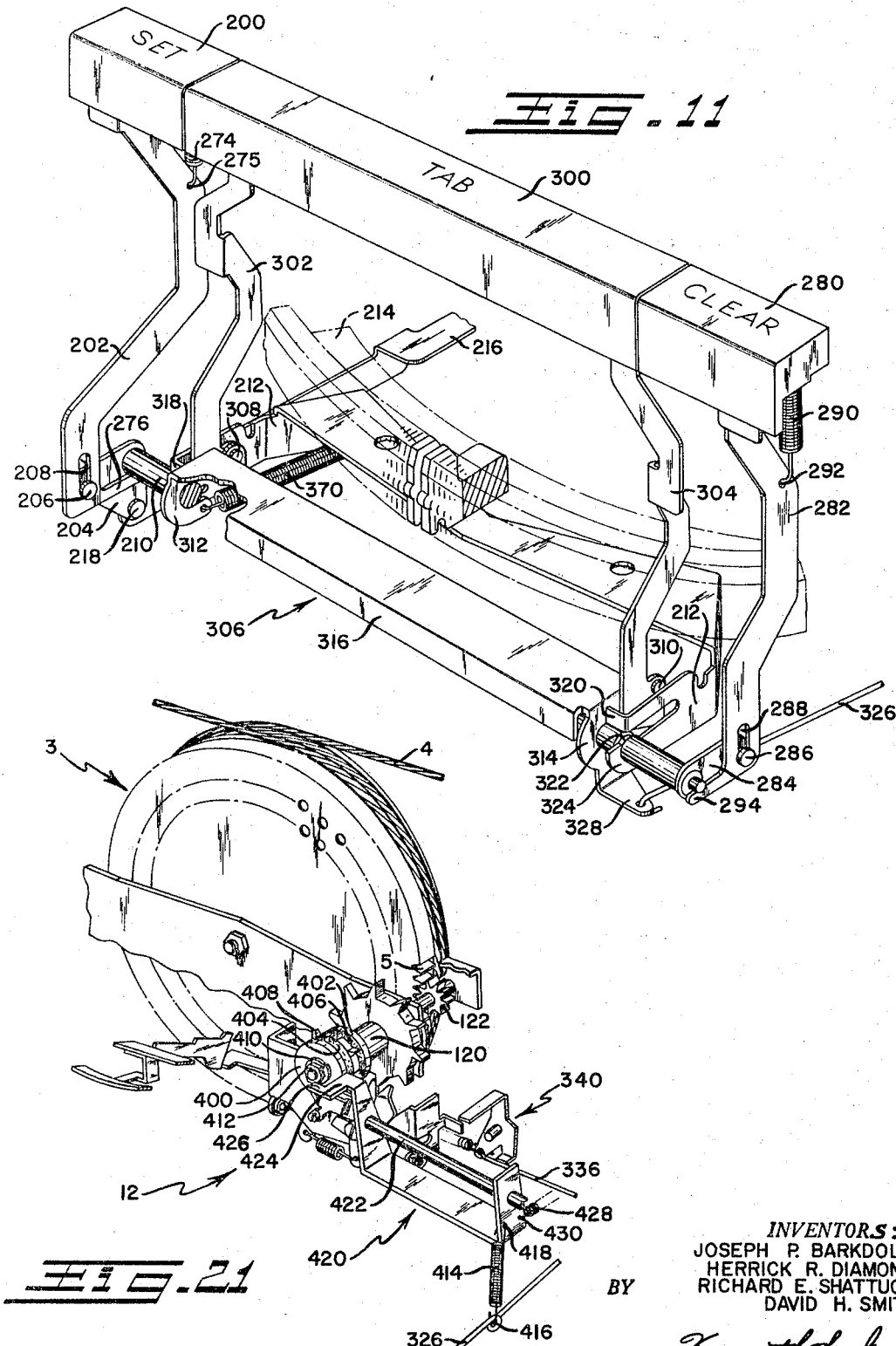

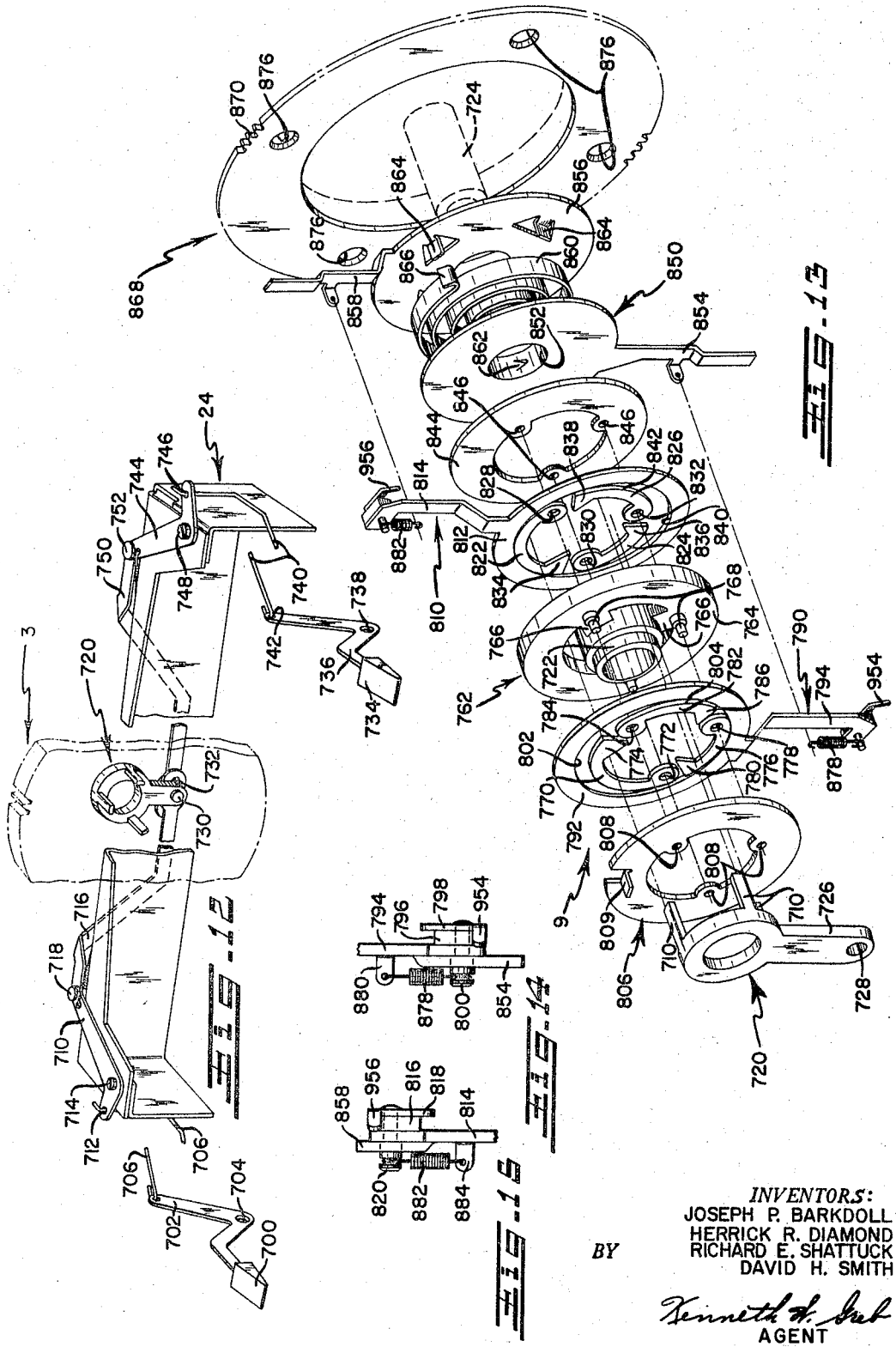

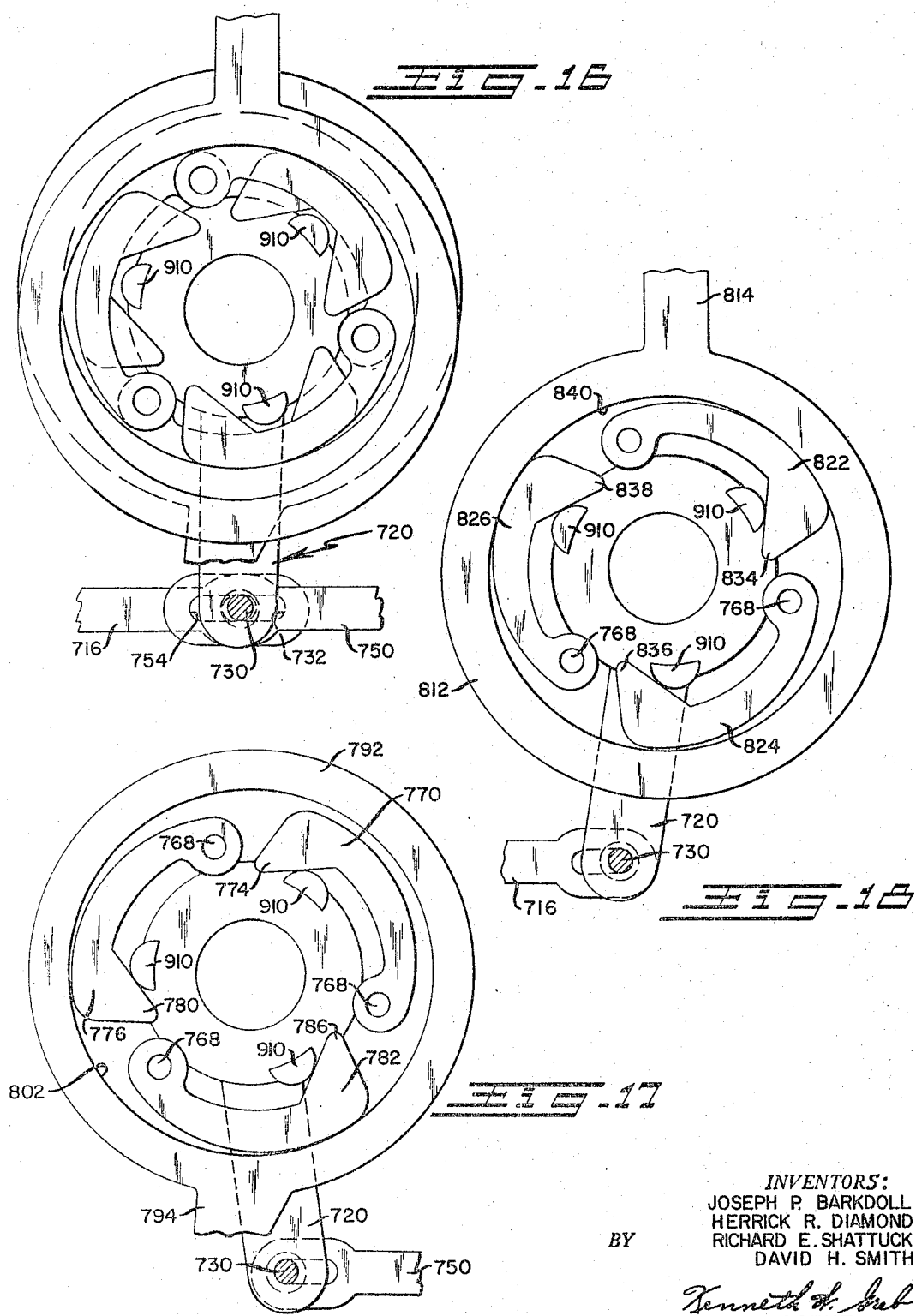

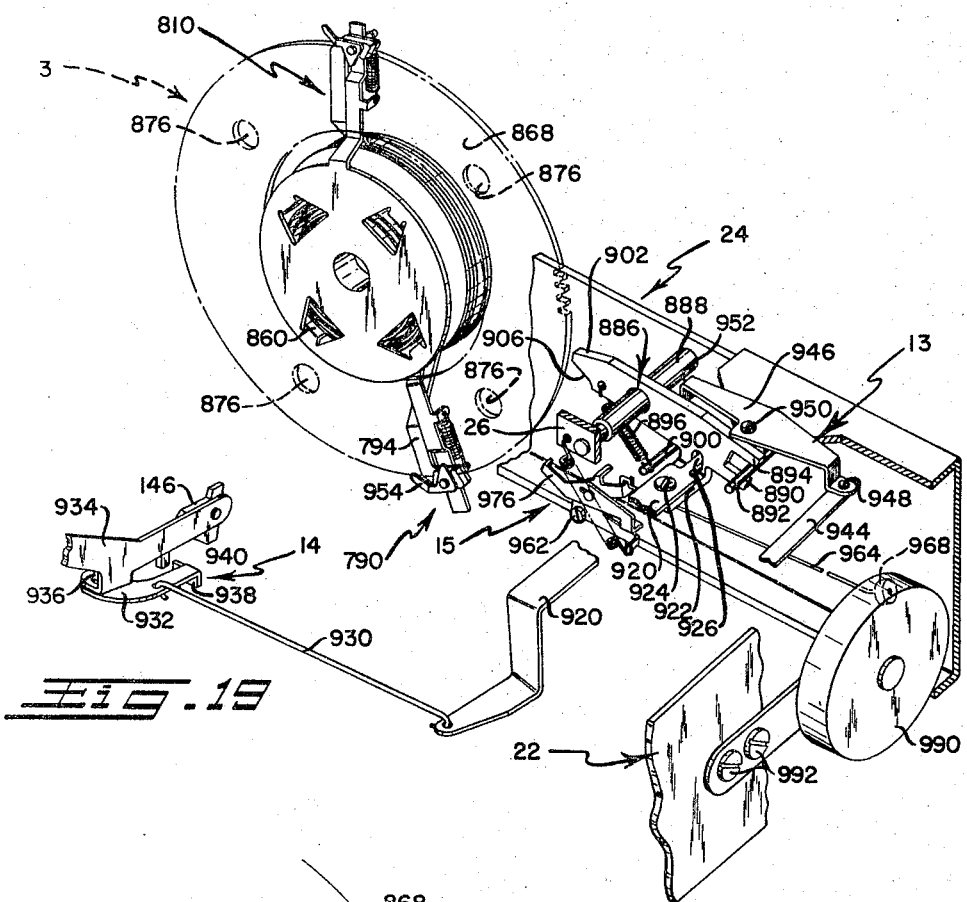
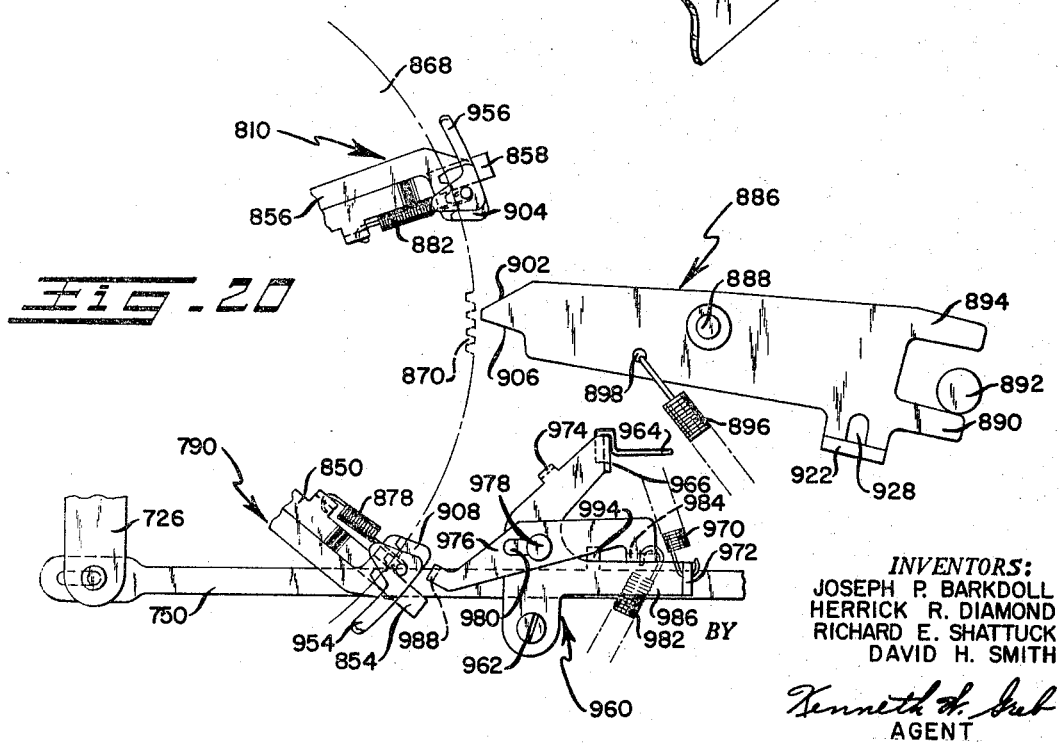

3,315,776
OFFICE MACHINE WITH ROTARY CARRIAGE
CONTROL MEMBER
Joseph P. Barkdoll, Groton, Herrick R. Diamond, Homer, and Richard E. Shattuck and David H. Smith, Cortland, N.Y., assignors to SCM Corporation, a corporation of New York
Filed Apr. 29, 1965, Ser. No. 451,912
33 Claims. (Cl. 197—60)

This invention relates to typewriters, teletypewriters or other movable carriage machines and more particularly to a novel carriage control means for the same. The novel carriage control means uses the principle of a rotatable wheel to provide several mechanical advantages over conventional carriage control means.

In conventional movable carriages, such as the conventional work sheet supporting typewriter carriages, the carriage is burdened by carrying a plurality of relatively heavy full carriage length toothed racks and bars. A toothed rack is used for connecting an escapement to the carriage. At least one and often two toothed bars are used for supporting a plurality of tabulator stops on the carriage. A toothed rack is used for mounting adjustable margin stops on the carriage and at least one and often two bars are mounted adjacent the margin regulators for actuating the same.

The combination of several racks and bars along with their supporting brackets and screws substantially contribute to the weight of a carriage. It is well known in the art of typewriters that the weight of the carriage is a highly critical factor in the performance of a typewriter. The performance of a typewriter is governed by the starting and stopping of the carriage for the printing of each character, by the starting and stopping of the carriage for a tabulation run and by the stopping of the carriage at the left and right margins, just to name a few. The torque required of the carriage main spring must be increased according to the weight of the carriage to accelerate the carriage for a tabulation run and to maintain a rapid repetitive spacing of the carriage during typing operations. This torque necessarily creates a vibration in the carriage and the associated mechanisms by these starting and stopping operations. The vibration causes excessive wear, loosening of assembled parts, and the fatiguing of parts that eventually causes deformation and/or breakage. This same vibration also causes the very common and very disturbing displacement of the typewriter from its normal typing position on a desk.

Another disadvantage of having the toothed racks mounted on the carriage is that each rack; the escapement rack, the margin regulator rack and the tabulator stop supporting rack, is individually mounted and individually adjusted on the carriage end frames. It is a long standing laborious task to properly adjust each rack to coincide with a conventional escapement so that the carriage may be accurately and constantly moved to any desirable letter space position by the operation of any one of the mentioned features.

A further disadvantage of having the toothed racks mounted on the carriage is that there is a highly undesirable excessive build up of tolerances in the fabrication of each part and in the assembly of the parts between the conventional escapment holding dog and any one of the above mentioned features and particularly the margin regulator rack. All of the tolerance deviations are overcome by having a plurality of precise adjustments throughout the mechanisms.

Still a further disadvantage of having the toothed racks mounted on the carriage is that the vibration of the carriage caused by the starting and stopping operations previously mentioned inherently substantially contributes to the conventional unpleasant typewriter noise.

Another disadvantage of having the racks mounted on the carriage is that the kinetic energy of the racks, moving longitudinal with the carriage movement induces a mechanical instability to all of the screw assembly connections on the carriage and to the carriage stop abutments on the main frame members. Another mechanical instability is that the long racks across the carriage are subject to bowing due to the torsional reactions of impact by a tabulation run or of impact by stopping the carriage with the margin regulators. When the screw assembly connections are suddenly subjected to the kinetic energy, quite often the parts are forced to shift out of adjustment. This type of loss of adjustment is one of the most common maintenance problems in the field and one of the most difficult to prevent.

The closest prior art to the present invention is a Patent 2,879,876 issued to L. E. Palmer et al. This patent discloses a nonconventional typewriter having a stationary work sheet supporting unit and a movable spherically shaped single printing element carriage and further having a rotary control concept which has several typewriter features associated therewith for said movable carriage. The present invention differs from this patent in that it provides a rotary control concept, referred to as a function wheel, for a conventional typewriter having a movable work sheet supporting carriage. Further differences of the Palmer et al. patent over the present invention will be pointed out as the individual features are described in the remainder of the specification.

It is the primary object of this invention to provide novel improved typewriters, which:

(a) the carriage weight is substantially reduced;
(b) the rate of the carriage incremental stepping movements in the letter feed direction is increased;
(c) the performance is quieter;
(d) provides an improved assembly procedure;
(e) requires fewer adjustments;
(f) have substantially reduced accumulation of tolerance run-out.

It is another important object of this invention to provide a novel rotary carriage control device supported by the main framework for substantially improving the performance and reliability of a typewriter.

Another object of this invention is to relieve the carriage of the undesirable excessive weight by removing the escapement rack from the carriage and replacing the same with a cable that is wound around the function wheel and has its ends rigidly assembled to the carriage end frames. A further reduction in carriage weight is accomplished by removing the margin stop rack, the margin stops and the associated actuating bars from the carriage and replacing the same with a novel margin regulator means that has a toothed wheel rigidly assembled to the function wheel and that has margin stops adjustably mounted on the function wheel. Still a further reduction in carriage weight is accomplished by removing the complete tabulator stop assembly unit from the carriage, which is a major weight factor, and replacing the same by mounting the plurality of tabulator stops in the function wheel. The reduction in carriage weight permits decreasing the torque required of the carriage main spring to advance the carriage, in the letter feed direction which in turn reduces the vibration each time the carriage is stopped. The reduction of vibration substantially reduces the wearing of parts, substantially reduces loosening of assembled parts and substantially reduces fatiguing of parts which prevents breakage.

Another object of this invention is to provide a typewriter having an increased typing speed over the conventional typewriters by substantially reducing the weight of the carriage.

A further object of this invention is to proportion the size of the function wheel and to locate the function wheel in the typewriter to accommodate a standard size portable typewriter.

Another object of this invention is to arrange the plurality of tabulator pins in a pair of adjacent annular rows in a staggered relationship to provide a pin for each carriage letter space in a function wheel particularly applicable to a portable size typewriter.

Still another object of this invention is to overcome the long standing unsatisfactory laborious task of properly adjusting each of the above described racks to coincide with the conventional escapement. By having a toothed wheel integral with the function wheel for the escapement control, by having the tabulator stops or pins mounted within the function wheel and by having the margin stop toothed wheel aligned with the escapement toothed wheel and rigidly assembled to the function wheel by screws or rivets, all of the individual laborious and precise adjustments normally required of these racks are eliminated.

A further object of this invention is to provide a rotary carriage control device that will substantially reduce the highly undesirable excessive build-up of tolerances between the conventional escapement holding dog and any one of the conventional racks by having the escapement directly control the function wheel assembly. This direct control eliminates a plurality of independent screw assembled connections required by the carriage mounted racks, the carriage frame roller mounting means, the escapement mounting brackets and the escapement holding dog. In the case of the margin regulator feature, the present invention has reduced accumulation of tolerance run-out to as little as one-third of that experienced in conventional machines. The low tolerance build-up reduces the number of adjustments required throughout the mechanism and also reduces malfunctioning which substantially improves the reliability of operation of the typewriter.

Another object of this invention is to reduce the number of adjustments formerly required by the screw assembled connections being suddenly subjected to the kinetic energy created by the excessive weight of the racks in stopping a moving carriage. The reduction of adjustments provides a solution to substantially reduce one of the most common maintenance problems in the field. The reduction of loss of adjustments also substantially improves the operating reliability of the typewriter.

Another object of this invention is to overcome the mechanical instability of the conventional carriage rack system by replacing the longitudinal racks with a rotary wheel system. This system eliminates the undesirable torsional reactions on the racks previously described. The rotary wheel system further overcomes the mechanical instability by applying the theory of the radius of gyration where the smaller the radius of gyration, the greater the mechanical stability of a mechanism. A first reduction of radius of gyration is a result of transferring the weight or mass of the racks from the carriage to the shaft supporting the wheel. A second reduction of radius of gyration is inherent in the wheel system in that the entire mass of the wheel is considered as concentrated at seven-tenths (.7) of the radius of the wheel. Therefore, the present rotary wheel system substantially increases the mechanical stability of the carriage controlling features.

Another advantage of this invention is that the removal of the racks and their associated parts from the carriage materially reduces conventional typewriter noise. The relatively little noise created by the function wheel can be further reduced by enclosing the function wheel area with any suitable sound absorbing material.

These and other objects of this invention will become more fully apparent by reference to the appended claims and as the following detailed description proceeds in reference to the accompanying drawings, wherein:

FIGURE 1 is a front perspective view showing the function wheel and its orientation with the framework of the typewriter, and showing a typical key action, an escapement, a portion of the tabulator set and clear mechanism, and a portion of the margin regulating means and their association with the function wheel;

FIGURE 2 is a top plan view showing a general configuration of a typewriter with a particular showing of the orientation of the keyboard feature keys with the function wheel;

FIGURE 3 is an enlarged front perspective view showing the escapement and its association with the function wheel;

FIGURE 4 is an enlarged sectional front perspective view of the complete function wheel assembly taken along line 4—4 of FIGURE 1;

FIGURE 5 is a front perspective view showing the cable anchored to the function wheel and a means for adjustably anchoring the end of the cable to a carriage end;

FIGURE 6 is a partial sectional view taken along lines 6—6 of FIGURE 5 showing the means for anchoring the cable to the function wheel;

FIGURE 7 is an enlarged partial rear elevational view showing an inactive area of the function wheel;

FIGURE 8 is a front perspective view showing the half space and back space and their association with the escapement and the function wheel;

FIGURE 9 is a front perspective view of a portion of the left side frame showing the half space and back space keys and linkages;

FIGURE 10 is a front perspective view showing the tabulator set and clear means, the tabulation counter stop means and a cut-away sectional portion of the function wheel;

FIGURE 11 is a front perspective view showing the tabulator set and clear keys and linkages and the tabulator counter stop bar and linkage;

FIGURE 12 is a front perspective view showing a left margin key and right margin key and their linkages for actuating the margin stops;

FIGURE 13 is a rear exploded perspective view of the margin regulating means;

FIGURE 14 is an end view showing the right margin stop assembly;

FIGURE 15 is an end view showing the left margin stop assembly;

FIGURE 16 is a partial front elevational view showing the margin regulator actuating means in a normal inoperative position;

FIG. 17 is a partial front plan view showing the margin regulating means actuated for releasing the right margin stop;

FIGURE 18 is a partial front elevational view showing the margin regulating means actuated for releasing the left margin stop;

FIGURE 19 is a front perspective view showing the margin stops in engagement with a toothed disc, an abutment to be contacted by the margin stops, a line lock means and means for actuating a bell;

FIGURE 20 is an enlarged partial elevational plan view of FIGURE 19;

FIGURE 21 is a front perspective view showing a carriage governor and its association with the function wheel.

Referring now to the drawings, FIGURE 1 illustrates a typewriter having a framework 1, a work sheet supporting carriage 2 movably mounted on framework 1, and a function wheel 3 rotatably mounted on framework 1, constructed in accordance with the principles of the present invention for controlling the movement of the carriage 2 in the letter feed direction and in the return direction. The novel features shown best in FIGURE 4 includes: a cable 4 rigidly anchored to the function wheel 3 intermediate its ends for connecting the function wheel 3 to the carriage 2; an escapement toothed wheel 5 integral with the function wheel 3 for connecting an escapement means 7 to the carriage 2; a plurality of tabulator pins 6 mounted in the function wheel 3 for connecting tabulation to the carriage 2; and a margin stop toothed wheel 8 rigidly assembled to the function wheel 3 for connecting automatic margin regulating means 9 to the carriage 2.

The function wheel 3 constructed in this manner provides advantages over the prior art firstly by supporting the major carriage components thereby substantially reducing the weight of a work sheet supporting carriage and secondly by rigidly tieing several features together in the form of a single element, function wheel 3, thereby substantially reducing the number of precise adjustments. This function wheel 3 is made of a synthetic resin but can be made from any suitable material.

Other typewriter features associated with the function wheel 3 and therefore benefiting from the same advantages are: a carriage back space 10 and a carriage half space 11, shown in FIGURE 8; a carriage governor 12 for tabulation, shown in FIGURE 21; margin stop abutment release means 13, right margin line lock means 14 and a right margin bell means 15, shown in FIGURE 19.

The framework 1 comprises a left side frame 20, a right side frame 22, a back frame 24 rigidly assembled to both side frames by screws 25, an inner back frame 26 rigidly assembled to back frame 24 by screws 28 and a lower carriage bed 30 rigidly assembled to the left side frame 20 and to the right side frame 22 by any suitable means.

The work sheet supporting carriage comprises an upper carriage bed 32 movably mounted on lower carriage bed 30 by commonly used carriage bearings 34; a right carriage end frame 36 and a left carriage end frame 38 rigidly assembled to the right end and left end respectively of the upper carriage bed 32; a platen 40 rotatably mounted in carriage end frames 36 and 38; feed rollers 42 supported by upper carriage bed 32 and positioned against platen 40 for advancing a work sheet around the platen 40; and a left carriage end cover 44, a left platen knob 46 and a linespace lever 48 as a common left carriage end assembly.

The diameter of the function wheel 3 is mainly determined by the tabulator pins 6. It is desirable to have one tabulator pin 6 for each carriage letter space. To accommodate the 10 inch common length carriage having approximately 100 letter spaces and to accommodate a standard size portable or standard size office typewriter, it is necessary to arrange the pins 6 in two annular rows. The radius of each annular row is to be large enough to provide sufficient material around each pin for strength purposes. Having one pin 6 for each carriage letter space necessarily restricts the rotation of function wheel 3 to one revolution and with the combination of features associated with the present function wheel 3, the rotation in either direction is approximtaely 30° less than one full revolution. The remaining features making up the function wheel 3 such as cable 4 wound around a portion of the periphery, escapement toothed wheel 5 formed integral around a portion of the periphery and margin stop toothed wheel 8 assembled to the wheel, are designed in relationship to the tabulator pins 6 for the single revolution, for manufacturability and for functionability.

To meet these requirements, the diameter of the present function wheel 3 is approximately 3½ inches. This size function wheel could fit into a standard size office typewriter easily but in order to fit in a portable size typewriter, which is one of the objects of the present invention, it is necessary to extend a substantial portion of the wheel into the carriage area without interferring with the carriage movability. This area is made available by the removal of the plurality of toothed racks and bars previously mentioned.

Therefore a portable typewriter having the many previously identified advantages over the prior art has been made possible by the conception of the function wheel 3 whose individual features will now be described in detail under separate headings.

Cable

The Anderson Patent 640,254 discloses a cable rigidly anchored intermediate its ends to a wheel shaped member having its ends rigidly connected to the ends of a carriage. The Palmer et al. Patent 2,879,876 discloses a wire connecting a spherically shaped single printing element supporting carriage to a wheel shaped member. The Byers Patent 3,093,230 discloses a pair of cords for connecting a wheel shaped member to a carriage, each cord having one end rigidly attached to the wheel shaped member and the opposite end rigidly connected to a carriage end.

The present invention differs from these patents in that the cable ends are adjustably connected to the carriage ends to properly adjust the carriage with respect to the wheel shaped member while maintaining a desirable tautness of the cable.

Referring to FIGURES 5, 6 and 7, the cable 4 is rigidly anchored to the function wheel 3 intermediate its ends by an anchor plate 50 which has an end portion 52 tightly wrapped around the cable and soldered thereto. Plate 50 is rigidly assembled to function wheel 3 by a pin 54 extending through a portion of the wheel and having a tapered end 56 flush with the surface of plate 50 for clearance purposes. A recess 58 in the periphery of the function wheel 3 is made available for end portion 52 of plate 50 to allow cable 4 to be wound around the wheel in grooves 60 without interfering with the plate.

Cable 4 is wound around function wheel 3 two turns although one turn would be sufficient since the maximum rotation of the wheel is one revolution and in this case less than one revolution for the function wheel has an inactive or dead area of approximately 30° to accommodate a pair of margin stops mounted thereon. The cable 4 has one end 62 extending to the left carriage end frame 38 and has the other end 64 extending to the right carriage end frame 36. End 62 has a threaded connector 66 rigidly assembled to the cable that extends through an aperture 68 in end frame 38. A nut 70 is threaded on connector 66 to abut against the outside surface of end frame 38 to adjust position of the carriage 2 in relationship to the function wheel 3. A lock nut 72 is also threaded on connector 66 to abut nut 70 and lock it in its adjusted position. Connector 66 has a flat portion 74 that is located against edge 76 of end frame 38 to prevent cable 4 from twisting when making the adjustment.

As shown in FIGURE 1, the right cable end 64 has a connector 78 assembled to the right carriage end frame 36 in the same manner as the left carriage end assembly having an adjusting nut 80 with a lock nut 82. To adjust the position of the carriage 2 in relationship to function wheel 3, the carriage is moved to the extreme left margin position and nuts 70 and 80 are first adjusted to tighten cable 4 and then adjusted to position the carriage to a desirable zero printing point for starting the line of write.

A main spring 86 for biasing carriage 2 in the letter feed direction is placed in a recess 87 in function wheel 3 and has its outer end 88 formed to hook over a tongue 89 integrally formed from wheel 3. The inner end 90 of spring 86 is rigidly assembled to a bushing 91 by a pin 92. Bushing 91 is rigidly staked to an adjusting plate 93 which is pivotable about shaft 94 for adjusting the amount of tension applied to the carriage 2. Adjusting plate 93 is held in its adjusted position by a lock arm 95 which is rigidly assembled to inner back frame 26 by a screw 96 and lock washer 97. Function wheel 3 is rotatably mounted on shaft 94 and is rotatable with respect to bushing 91.

Escapement

Referring to FIGURES 1 and 3, escapement 7 is of a full drop type as described in United States Patent 2,649,179 issued to J. P. Barkdoll, Aug. 18, 1953. A full drop escapement in itself provides faster typing speeds over the conventional fractional drop escapements. The full drop escapement 7 used in conjunction with the function wheel 3 provides a typewriter having a further increase in typing speeds over the conventional typewriters.

Byers Patent 3,093,230 discloses an escapement directly operable with a drum that is connected to a carriage by a cord. The Seidelinger Patent 1,820,329 discloses an escapement operatively connected to a wheel shaped member which controls the movement of the carriage. The escapements in both of these patents are the conventional fractional drop type and therefore are not capable of operating at the speeds of the present invention. The Palmer et al. Patent 2,879,876 discloses a single dog type escapement operating directly on a wheel shaped member which is an entirely different escapement means from the present invention.

For convenience, a brief explanation of the full drop escapement 7 will follow and further details are available by reference to the above identified Barkdoll patent. As best shown in FIGURES 3 and 8, a rocker 100 is pivotably mounted on a bracket 102 by adjustable screws 104. Bracket 102 is assembled to inner back frame 26 by screws 106 (only one shown). A holding dog 108 is pivotably mounted on rocker 100 by a shouldered screw 110 and a stepping dog 112 is pivotably mounted on rocker 100 by a shouldered screw 114. A spring 116 interconnects the lower ends of dogs 108 and 112 thereby biasing each dog in its normal rest position. A star wheel 118 having a tooth normally engaged with holding dog 108, is rigidly mounted on a shaft 120 which is pivotably supported by inner back frame 26 and bracket 102. A pinion 122 is rigidly mounted near the rearward end of shaft 120 and is in mesh with the toothed wheel 5 of the function wheel 3.

When rocker 100 is pivoted clockwise by actuating a key action (FIGURE 1) or a space bar action (not shown), holding dog 108 is rocked out of the path of the star wheel teeth and the stepping dog 112 enters the path of the teeth so as to be picked up by the next tooth. The carriage main spring 86 biases function wheel 3 counter-clockwise and by way of pinion 122 and shaft 120, star wheel 118 pivots clockwise causing a tooth to contact and pivot stepping dog 112 counter-clockwise an equivalent of a full letter space. The full letter space travel of stepping dog 112 is determined by a pin 126, which is rigidly assembled to stepping dog 112, abutting against holding dog 108 which essentially lines up the stepping dog 112 with the holding dog 108 such that the counter-clockwise return of rocker 100 to its normal position allows the holding dog 108 to enter the path of the tooth that rocked the stepping dog 112 and arrest the carriage without further rotation of star wheel 118.

As shown in FIGURE 1, the key action for actuating escapement 7 includes depressing key lever 128 which rotates an arm 130 clockwise about its pivot 132. Key lever 128 pulls link 134 downward which pivots sub-lever 136 counter-clockwise about its pivot 137. Sub-lever 136 pulls connector 138 forward which pivots type bar 140 clockwise about its pivot 142. Type bar 140 has a step portion 144 which contacts and drives universal bar 146 toward the rear of the machine. Universal bar 146 has a foot 148 that contacts finger 150 which integrally extends from rocker 100 thereby pivoting rocker 100 clockwise for actuating a single letter space movement.

*Tabulator stop set and clear*

The Palmer et al. Patent 2,879,876 and the Seidelinger Patent 1,820,329 are representative of having a plurality of tubulator stops mounted annularly in a wheel shaped member. These patents disclose only a single annular row of stops and do not disclose a means for setting and clearing the same. Smith Patent 1,054,875 discloses a single annular row of stops with set and clear keys located adjacent the stops at the back of the machine which is considered awkward and inconvenient. The disadvantage of having only a single row of stops is that a highly undesirable large diameter wheel shaped member would be required to provide a stop for each carriage letter space for an office size typewriter. The large diameter wheel shaped member would be further undesirable and quite impractical for a portable typewriter.

The advantages of the present invention over this prior art is to arrange the plurality of stops in a pair of annular rows and alternately staggered in each row to accommodate a portable typewriter; to provide set and clear means for actuating the stops in either annular row; and to provide keyboard control set and clear keys.

In reference to FIGURES 10 and 11, a tabulator stop set key 200 is rigidly assembled to a key stem 202 at its upper end. The lower end of stem 202 is pivotably and slidably connected to an arm 204 by a pin 206 which is riveted to arm 204 and has a shouldered portion extending through an elongated aperture 208 in stem 202. Arm 204 is rigidly assembled to a shaft 210 which is pivotably supported in a bracket 212. Bracket 212 is rigidly anchored to a rigid frame member 214 by conventional screw means. An actuator 216 is pivotably connected at its forward end to arm 204 by a shouldered pin 218 and is slidably supported at its rearward end in a horizontally disposed slot 220 in inner back frame 26.

The depression of set key 200 causes key stem 202 to first take up the lost motion of aperture 208 and then contact pin 206 which is forward of shaft 210 to pivot arm 204 counter-clockwise about the axis of shaft 210. Arm 204 then drives actuator 216 toward the rear of the machine.

Actuator 216 has an upstanding formed finger 222 disposed between an extension 224 of a tabulator stop set arm 226 and an extension 228 of a tabulator stop clear arm 230 (FIGURE 10). A screw 232 has an extended shoulder 234 and is rigidly threaded into inner back frame 26. Set arm 226 is pivotably mounted on shoulder 234 of screw 232 by an aperture in an upper ear 236 and an aperture in a lower ear 238 formed therefrom. Set arm 226 has a finger 240 extending behind a portion of function wheel 3 and has an end 242 formed inward of a sufficient width to span both annular rows 244 and outer annular row 246 for setting the tabulator stops 6 to a carriage stopping position. Clear arm 230 is also pivotably mounted on shoulder 234 of screw 232 by an aperture in an upper ear 248 and an aperture in a lower ear 250 formed therefrom.

Clear arm 230 has a finger 252 extending in front of a portion of function wheel 3 and has a V shaped end 254 of a sufficient width to span annular rows 244 and 246 for clearing the stops 6 to a non-carriage stopping position. A spring 256 has one end connected to a spring anchor 258 extending from set arm 226 and has the other end connected to a spring anchor 260 extending from clear arm 230. Spring 256 biases set arm 226 counter-clockwise about screw 232 to a limited position determined by extension 224 abutting against inner back frame 26 and biases clear arm 230 clockwise about screw 232 to a limited position determined by extension 228 abutting against inner back frame 26.

Tabulator stops 6 are circular shaped pins, best shown by FIGURE 4, that extend through two sections 262 and 264 of function wheel 3 and have notched portions 266 and 268. A coil spring 270 having its ends interconnected to form a complete circle is assembled around the outside of stops 6 seated in notches 266 or 268 in outer row 246 with a slight amount of tension to act as a detent to hold stops 6 in either their set or clear position. A similar coil spring 272 is assembled to act as a detent to hold the stops 6 in inner row 244 in either their set or clear position.

The rearward motion of actuator 216 causes finger 222 to contact extension 224 and pivot set arm 226 clockwise about screw 232 causing formed end 242 to contact and move a stop 6 from a clear position as shown by upper stop 6 in FIGURE 4 to a set position as shown by the lower stop 6 in FIGURE 4. Being the pins are alternately staggered in each row, if the function wheel 3 were positioned one space in either direction of the pin shown, a stop in inner annular row 244 would be moved to a set position.

Upon release of set key 200, a spring 274, having one end connected to a frame member and the other end connected to stem 202 at aperture 275, biases stem 202 upward to a limit position determined by an extension 276 extending integrally from stem 202 abutting against the lower portion of shaft 210. The upward biasing movement of stem 202 picks up pin 206 and pivots arms 204 clockwise about the axis of shaft 210 to return actuator 216 toward the front to its normal inoperative position. Spring 256 biases set arm 226 counter-clockwise to its inoperative position.

A tabulator stop clear key 280 is rigidly assembled to a key stem 282 at its upper end. The lower end of stem 282 is pivotably and slidably connected to an arm 284 by a pin 286 which has a shouldered portion extending through an elongated aperture 288 in stem 282. Arm 284 is rigidly assembled to shaft 210.

A set tab stop 6 is cleared by depressing clear key 280 causing key stem 282 to first take up the lost motion of aperture 288 and then contact pin 286 which is rearward of shaft 210 to pivot arm 284 clockwise about the axis of shaft 210. Arm 284 being rigid to the shaft pivots shaft 210 clockwise which now pivots arm 204 clockwise pulling actuator 216 toward the front of the machine.

Set key 200 and stem 202 are not affected by the clockwise movement of arm 204 due to pin 206 being free to move upward in aperture 208. Likewise, clear key 280 and stem 282 are not affected by the counterclockwise movement of arm 204 due to pin 286 being free to move upward in aperture 288.

The forward motion of actuator 216 causes finger 222 to contact extension 228 and pivot clear arm 230 counter-clockwise about screw 232 causing V shaped end 254 to contact and move a stop 6 to its clear position. If the function wheel 3 were positioned one space in either, a set stop in inner annular row 244 would be moved to a clear position.

Upon release of clear key 280, a spring 290, having one end connected to a frame member and the other end connected to stem 282 at aperture 292, biases stem 282 upward to a limit position determined by an extension 294 extending integrally from stem 282 abutting against the lower end portion of shaft 210. The upward biasing movement of stem 282 picks up pin 286 and pivots arm 284 counter-clockwise about the axis of shaft 210 to return actuator 216 toward the rear of the machine to its normal inoperative position.

*Tabulation*

As pointed out earlier, the Palmer et al. Patent 2,879,876, the Seidelinger Patent 1,820,329 and the Smith Patent 1,054,875 all are representative of having a plurality of tabulator stops mounted annularly in a wheel shaped member but the stops are arranged in a single row which has been noted as undesirable. Developing a counterstop means for a single annular row requires little more than a slight modification from the conventional counter-stop means used for conventional rack assembled tabulator stops.

The advantages of the present invention over this prior art is to arrange the stops in a pair of annular rows to accommodate a portable typewriter and to provide a counter-stop means to enter into the path of set stops in either annular row.

Referring again to FIGURES 10 and 11, a tabulator bar 300 is rigidly assembled at the upper end of one key stem 302 and at the upper end of a second key stem 304. The lower end of key stem 302 is pivotably assembled to one end of a bracket 306 by a pin 308 and the lower end of key stem 304 is pivotably assembled to the other end of bracket 306 by a pin 310. Bracket 306 is pivotably mounted on shaft 210 at its left end by a U-shaped finger 312 and at its right end by another U-shaped finger 314. Bracket 306 has a formed edge 316 extending along its length to prevent twisting and therefore assure a parallelism between the tab bar 300 and bracket 306 when bar 300 is depressed. An ear 318 formed from the left end of rigid bracket 212 and ear 320 formed from the right end of rigid bracket 212 locates pivotable bracket 306 longitudinally along shaft 210 as well as holds shaft 210 downward in a pivotable relationship with rigid bracket 212 shown by a groove 322 in shaft 210 seated in a hooked shaped extension 324 of rigid bracket 212. A link 326 is connected at its forward end to an arm 328 formed from pivotable bracket 306 and is connected at its rearward end to an upper leg of a bellcrank 330. Bellcrank 330 is pivotably mounted on a shouldered screw 332 which is rigidly threaded into a frame member 334.

Another link 336 is connected at one end to a lower leg of bellcrank 330 and is connected at the other end to a downward extending arm 338 of an actuator 340. Actuator 340 is pivotably mounted on inner frame 26 by a shouldered screw 342. A lower counter stop 344 is pivotably mounted intermediate its ends on inner frame 26 by a shouldered screw 346. The extreme left end of counter-stop 344 has rearward formed abutment 348 for abutting a set tab stop 6 in outer annular row 246 and the extreme right end has an aperture 350 for a spring anchor. An upper counter-stop 352 is pivotably mounted intermediate its ends on inner frame 26 adjacent screw 346 by a shouldered screw 354. The extreme left end has a foot shaped abutment 356 for abutting a set tab stop 6 in inner annular row 244 and the extreme right end has a notch 358 for a spring anchor. A spring 360 has one end connected in aperture 350 of counter-stop 344 and has the other end connected in notch 358 of counter-stop 352. Spring 360 biases lower counter stop 344 clockwise about screw 346 to a limited position determined by leg 362 of counter-stop 344 abutting against a stop arm 364 formed from actuator 340 to normally position abutment 348 below and out of the path of outer annular row 246 of tab stops 6. Spring 360 simultaneously biases upper counter stop 352 counter-clockwise about screw 364 to a limited position determined by leg 366 abuting against a second stop arm 368 formed from actuator 340 to normally position abutment 356 above and out of the path of inner annular row 244 of tab stops 6.

The depression of tabulator bar 300 causes key stems 302 and 304 to pivot bracket 306 clockwise about shaft 210 which pulls link 326 toward the front of the machine. The forward movement of link 326 pivots bellcrank 330 clockwise about screw 332 which in turn pulls link 336 toward the right. The rightward movement of link 336 pivots actuator 340 counter-clockwise about screw 342 which pivots stop arm 364 to the left and downward allowing spring 360 to bias abutment 348 of lower counter stop 344 upward to enter the path of a set tab stop 6 in outer annular row 246. The counter-clockwise movement of actuator 340 pivots stop arm 368 to the right and upward allowing spring 360 to bias abutment 356 of upper counter-stop 352 downward to enter the path of a set tab stop 6 in inner annular row 244. The counter-clockwise movement of actuator 340 also causes stop arm 364 to contact an ear 369 formed from escapement rocker 100 and pivot the escapement dogs out of the path of star wheel 118 for freeing the carriage for a tabulation run.

This counter stop arrangement provides a simultaneously positioning of an independent counter stop in the path of each annular row each time tabulator bar 300 is depressed for stopping the carriage regardless of which row a tab stop is set. This counter stop arrangement also provides a clearance when in inoperative position for the V shaped end 254 of tab clear arm 230 to contact and clear tab stops in either row.

Upon release of tabulator bar 300, a spring 370, having one end connected to finger 312 of pivotable bracket 306 and the other end connected to rigid bracket 212, biases bracket 306 counter-clockwise about shaft 210 to return bar 300 upward to its normal inoperative position. This position is determined by an extension (not shown) at the low end of stem 302 abutting against the underside of shaft 210. A second spring 372, having one end connected to screw 346 and the other end connected to arm 338 of actuator 340, being stronger than spring 360 biases actuator 340 clockwise about screw 342 to assist spring 370 in returning the mechanism back to the normal inoperative position. The clockwise movement of actuator 340 causes stop arm 364 to pivot lower counter stop 344 counter-clockwise to its inoperative position and causes stop arm 368 to pivot upper counter stop 352 clockwise to its inoperative position.

*Tabulator governor*

The concept of the present tabulator governor is basically disclosed by B. M. Des Jardins Patent 1,530,885 issued Mar. 24, 1925. The difference being that the present governor is operatively connected to the function wheel 3 for controlling the rate of travel of the novel lightweight work sheet supporting carriage.

Referring to FIGURE 21, the escapement shaft 120 having the pinion 122 rigidly mounted at one end and in engagement with the function wheel 3 has a braking means mounted at the other end for adapting an economical and efficient governor with the function wheel 3. The braking means includes: two outside metal washers 400 and 402 are keyed to a smaller diameter portion of shaft 120 for rotation therewith, two friction washers 404 and 406 made of felt or other suitable material are rotatable with respect to shaft 120 and are positioned between metal washers 400 and 402 and adjacent thereto, a toothed wheel 408 is positioned between washers 404 and 406, a lock washer 410 is positioned against metal washer 400, and a nut 412 is threaded on the end of shaft 210 for sandwiching the assembly on the shaft and for adjusting the governing effect.

Depressing tab bar 300 frees the carriage for movement in the letter feed direction under the influence of the main spring 86 which allows shaft 120 to rotate clockwise causing the braking means to rotate therewith. As previously described, the depression of tab bar 300 also pulls link 326 toward the front of the machine. A spring 414 has one end connected in a loop 416 formed in link 326 and has the other end connected in an aperture 418 in a bellcrank 420. Bellcrank 420 is pivotably mounted on a shaft 422 which is conventionally supported in a frame member (not shown). The forward motion of link 326 causes spring 414 to pivot bellcrank 420 clockwise about shaft 422 driving a shoulder 424 formed from bellcrank 420 into the path of the teeth of toothed wheel 408 to block the wheel from rotation. Blocking the rotation of toothed wheel 408 produces a braking effect by the friction washers 404 and 406 rubbing against the respective rotating metal washers 400 and 402. The clockwise pivoting of bellcrank 420 is limited by a finger 426 extending from shoulder 424 abutting against metal washer 400.

The carriage will advance in the letter feed direction at a rate determined by this governor until a set tab stop 6 contacts a counterstop or until the tab bar 300 is released. Upon releasing tab bar 300, link 326 is biased toward the rear of machine relaxing the stretched spring 414 and allowing a lesser tension spring 428, having one end connected to bellcrank 420 at aperture 430 and the other end connected to any rigid spring anchor, to bias bellcrank 420 counterclockwise to its normal inoperative position which moves shoulder 424 out of the path of toothed wheel 408 thereby rendering the governor ineffective.

*Back space*

The Seidelinger Patent 1,820,329 and the Palmer et al. Patent 2,879,876 disclose a back space means for actuating a wheel shaped member to reverse a typewriter carriage a single space at a time. Both of these back space means have a back space pawl directly engaging the wheel shaped member for reversing the carriage which burdens the operator with a relatively heavy touch.

The advantage of the present back space means over this prior art is that the present back space pawl engages the escapement star wheel for reversing the carriage which by means of shaft 120 and pinion 122 provides a mechanical advantage resulting in a lighter touch for the operator.

Referring to FIGURES 8 and 9, a back space key 500 is rigidly assembled to a key lever 502 which is pivotably mounted on a shaft 504 that is rigid in left side frame 20. A link 506 is connected at one end in an aperture 508 at the rearward end of key lever 502 and is connected at the other end in an aperture 510 in one leg of bellcrank 512. Bellcrank 512 is pivotably mounted on an arm 514 formed from back frame 24 by a shouldered screw 516. A connector 518 is pivotably assembled intermediate its ends to the second leg of bellcrank 512 by a shouldered screw 520 and is rigidly assembled at its right end to a back space pawl 522 by a screw 524. An upstanding finger 526 formed from connector 518 extends through an elongated aperture 528 in pawl 522. Screw 524 extends through a second elongated aperture 530 in pawl 522. By loosening screw 524 and by having the elongated apertures 528 and 530, the total length of connector 518 and pawl 522 is adjustable. The right end of pawl 522 has a substantially rectangular shaped aperture 532 and is slidably supported on bracket 102 such that the teeth on escapement star wheel 118 extend therethrough. A shouldered pin 534 extends through aperture 532 for guiding pawl 522 and is rivetted to bracket 102.

The depression of back space key 500 pivots key lever 502 counterclockwise about shaft 504 which pulls link 506 toward the front of the machine. The forward movement of link 506 pivots bellcrank 512 clockwise about screw 516 which drives pawl 522 to the left, causing end 536 to engage a tooth of star wheel 118 and pivot star wheel 118 counterclockwise about shaft 120 a sufficient amount for one letter space. The movement of pawl 522 to the left is limited by an abutment 537 extending from connector 518 abutting against the inside surface of left side frame 20. The counterclockwise pivoting of shaft 120 causes pinion 122 to pivot function wheel 3 clockwise about its shaft 94 thereby backspacing the carriage.

Upon releasing back space key 500, a spring 538 having one end connected to pawl 522 by hooking in a pair of apertures 540 and having the other end connected to bracket 102 in aperture 542, biases pawl 522 toward the right which pivots bellcrank counterclockwise about screw 516 thereby returning key 500 to its normal inoperative position.

*Half space*

The closest known prior art to the present invention on half space mechanisms is disclosed in a copending application, No. 300,823 filed Aug. 8, 1963, by Arthur C. Goldsmith and Anthony N. Paone for "Typewriter." A half space mechanism, as explained in detail in the above identified copending application, provides a feature for correcting typing errors without costly retyping a page having one or more errors and provides a feature for producing even right-hand margins. This copending application discloses a half-space mechanism particularly adaptable to a full drop escapement. It is the object of the present invention to provide a half-space mechanism that is particularly adaptable to a full drop escapement in combination with the novel function wheel carriage control.

Referring to FIGURES 8 and 9, a half-space key 600 is rigidly assembled to a key stem 602 which is pivotably mounted on keylever 604 by a pin 606. Keylever 604 is pivotably mounted on left side frame 20 by a shouldered screw 608 in threaded engagement with the keylever. A vertical arm 610 is pivotably mounted on left side frame at its upper end by a shouldered screw 612 just below an abutment portion 614 of keylever 604. A horizontal arm 616 is pivotably mounted at its right end to a rigid bracket (no shown) by a shouldered screw 618. A link 620 is connected at one end in an aperture 622 at the lower end of vertical arm 610 and is connected at the other end in an aperture 624 at the left end of horizontal arm 616. A second link 626 is connected at its forward end in an aperture 628 in horizontal arm 616 and is connected at its rearward end in an aperture 630 in a lower tab 632 formed from a bellcrank 634. Bellcrank 634 has a formed U shaped portion for pivotably mounting the bellcrank on a shaft 636 which is rigidly assembled to bracket 102. Bellcrank 634 is retained on shaft 636 by a keeper 638. A finger 640 extending upward from bellcrank 634 for abutting escapement rocker 100. A half-space pawl 642 is adjustably assembled to an upstanding arm 644 extending from bellcrank 634 by a screw 646 extending through an elongated aperture 648 in arm 644 and in threaded engagement with pawl 642. Pawl 642 has a formed ear 650 for abutting the teeth of star wheel 118.

The depression of half-space key 600 pivots keylever 604 counterclockwise about screw 608 causing a projection 652 to contact and cam along edge 654 of vertical arm 610 to pivot arm 610 clockwise about screw 612. The down stop for keylever 604 is determined by edge 656 of keylever 604 becoming flush with edge 654 of vertical arm 610 such that an interference occurs between the keylever and arm and their respective pivot screws 608 and 612. The clockwise movement of arm 610 pulls link 620 toward the front of the machine which pivots horizontal arm 616 counterclockwise about screw 618. Arm 616 then pulls link 626 toward the front of the machine which pivots bellcrank 634 clockwise about shaft 636. The clockwise movement of bellcrank 634 causes finger 640 to contact and pivot rocker 100 clockwise about its pivot screws 104 to free the star wheel 118 from the holding dog 108 and simultaneously positions ear 650 of pawl 642 in the path of a star wheel tooth to block the star wheel 118 at a point to position the carriage at one-half of a normal letter space. This condition is to be maintianed while printing a character in a one-half space position for making the correction.

Upon release of half-space key 600, a spring 658, having one end connected to finger 640 and the other end connected to a rigid frame member, biases bellcrank 634 counter-clockwise about shaft 636 to a rest position determined by arm 644 abutting against a tab 660 formed from bracket 102. The counter-clockwise movement of bellcrank 634 pulls ear 650 of pawl 642 out of the path of the star wheel teeth and allows the escapement rocker 100 to return to its rest position so that the holding dog 108 will block the star wheel to position the carriage in a normal letter space position. The counter-clockwise movement of bellcrank 634 also return key 600 and its linkage to a normal inoperative position.

*Automatic margin regulators*

The F. F. Anderson Patent 640,254 is the closest known prior art to the present automatic margin regulating means. This patent discloses a single margin stop that is rotatably adjustable on a wheel shaped member for varying only the end (right margin) of the line of write. The disadvantage of having only a single margin stop is that the operator has no flexibility for varying the beginning (left margin) of the line of write which, for today's typing needs, is just as important as varying the end of the line of write. Another disadvantage of this patent is that the margin stop is located on the front side of the wheel shaped member and the wheel shaped member is mounted vertically on the back panel of the machine resulting in a very inconvenient adjustable margin stop.

The present invention overcomes these disadvantages by providing an independently adjustable left and right margin stop for maximum flexibility and by providing conveniently located keyboard control keys for adjusting the margin stops. A further advantage of the present invention over the Anderson patent is that the present margin stops are rotatably spring biased thereby providing automatic margin adjusting means.

The Palmer et al. Patent 2,879,876 selects one of a plurality of pins for an adjustable margin stop means. These pins appear to be the same pins used for tabulator stops and operate in the same manner in that the pins are shiftable from an inoperative position to an operative position. The disadvantage of this means is that two additional steps by the typist are necessary to adjust a margin position. The first step is to move the carriage (in either direction depending on which margin is to be adjusted) until it abuts a margin stop and the second step is to actuate a key to shift the stop from an operative position to an inoperative position. The remaining steps to provide another margin stop position are conventional, such as, to move the carriage to the desirable new position and to actuate a key to position a margin stop at that carriage setting. The present invention does not require these additional steps to adjust the margin positions.

Another disadvantage of the Palmer et al. margin stop means is that several pins could be in a projected operative position throughout the carriage length unknown to the operator which could repeatedly interrupt her regular typing. In order to clear the excess pins from the operative position, the operator would have to repeat the previously described additional two steps which would be highly inconvenient and undesirable. The present invention overcomes this disadvantage by having only the desirable adjustable left and right margin stop.

Referring to FIGURES 12 and 13, a left margin key 700 is rigidly assembled to a key stem 702 which is pivotably mounted on the left side frame 20 by a shoulder screw (not shown) in aperture 704. A link 706 is connected at its forward end to key stem 702 in aperture 708 and is connected at its rearward end to one leg of an L shaped bellcrank 710 in aperture 712. Bellcrank 710 is pivotably mounted on back frame 24 by a shouldered screw 714. A connector 716 has its left end pivotably connected to the other leg of the L shaped bellcrank 710 by a shouldered pin 718. An actuator 720 is rotatably mounted on a hub 722 which in turn is mounted on a tube-shaped extension 724 extending integrally from and along the axis of function wheel 3.

Actuator 720 has a downward extending arm 726 with an aperture 728 near the end thereof. A pin 730 is rigidly mounted on arm 726 at aperture 728 and extending toward the rear of the machine having its axis parallel with the axis of actuator 720. Connector 716 has its right end connected to arm 726 of actuator 720 by pin 730 extending through an elongated aperture 732 in connector 716 best shown in FIGURE 16.

A right margin key 734 is rigidly assembled to a key stem 736 which is pivotably mounted on the right side frame 22 by a shoulder screw (not shown) in aperture 738. A link 740 is connected at its forward end to key stem 736 in aperture 742 and is connected at its rearward end to one leg of an L shaped bellcrank 744 in aperture 746. Bellcrank 744 is pivotably mounted on back frame 24 by a shouldered screw 748. A connector 750 has its right end pivotably connected to the other leg of the L shaped bellcrank 744 by a shouldered pin 752 and has its left end connected to arm 726 of actuator 720 by pin 730 extending through an elongated aperture 754 in connector 750 best shown in FIGURE 16. A keeper 756 is seated in a groove near the end of pin 730 for holding one end of each connector 716 and 750 on pin 730. Actuator 720 is preferably made of a plastic material but other suitable materials could be used.

In reference to FIGURE 2, left margin key 700 and right margin key 734 extend horizontally toward the operator immediately above the keyboard 760 at approximately the same vertical plane as the tabulator bar 300 and tab set and clear keys 200 and 280 thereby providing keyboard control means for adjusting the margin stops.

The detail construction of the automatic margin stops will now be described and reference is made particularly to FIGURE 13. A spacer 762 is preferably made of a plastic material but other suitable materials could be used. Spacer 762 has an outer disc shaped portion 764 with an inner hub 722 formed integral therewith by spokes 766. Three metal pins 768 are rigidly assembled in spacer 762 and are equally spaced from each other with the same radius from the axis of hub 722. The pins 768 have a larger diameter portion extending from each side of the disc portion 764. An arcuate shaped dog 770 is pivotably mounted on a pin 768, at one end of aperture 772 fitting on the larger diameter portion of the pin. Dog 770 extends clockwise about the axis of spacer 762 and terminates with an enlarged cam portion 774. A second arcuate shaped dog 776 is pivotably mounted on a second respective pin 768 by aperture 778 fitting on the pin. This dog 776 also extends clockwise about the axis of spacer 762 and terminates with an enlarged cam portion 780. A third arcuate shaped dog 782 is pivotably mounted on a third respective pin 768 by aperture 784 fitting on the pin. This dog 782 also extends clockwise about the axis of spacer 762 and terminates with an enlarged cam portion 786.

A right margin stop 790 (FIGURE 13) has a ring shaped base portion 792 with an arm 794 extending substantially radially outwardly therefrom. A toothed shaped element 796 (FIGURE 4) having a plurality of teeth extending radially inwardly toward the axis of the stop 790 is rigidly assembled at the outer end of arm 794 by brazing or other suitable means (FIGURES 4, 13 and 14). A retainer 798 is positioned against the toothed shaped element 796 and rigidly assembled thereto by a pin 800 having a shoulder portion abutting against arm 794, extending through arm 794, element 796, retainer 798 and headed over against retainer 798. This assembly is brazed and pinned to provide a reliable assembly to withstand relatively high impact forces required of margin stops. The ring shaped base portion 792 is positioned against disc shaped portion 764 having its inside edge 802 exposed to the outside edge 804 of each arcuate shaped dog 770, 776 and 782. A retainer plate 806 has three small apertures 808 that fit over small diameter extensions of the three pins 768 for movably mounting the dogs 770, 776 and 782 and the ring shaped base portion 792 of margin stop 790 on spacer 762. The end of pins 768 are headed over against plate 806. Plate 806 also has a tab 809 formed rearward and fits in a notch 811 (FIGURE 4) in back frame 24 to prevent rotation in either direction which holds spacer 762 and therefore dogs 770, 776 and 782 stationary with respect to rotational movement about the axis of shaft 94.

A left margin stop 810 has a ring shaped base portion 812 with an arm 814 extending substantially radially outwardly therefrom. A toothed shaped element 816 having a plurality of teeth extending radially inwardly toward the axis of the stop 810 is rigidly assembled at the outer end of arm 814 by brazing or other suitable means (FIGURES 4, 13 and 15). A retainer 818 is positioned against the toothed shaped element 816 and rigidly assembled thereto by a pin 820 having a shoulder portion abutting against arm 814, extending through arm 814, element 816, retainer 818 and headed over against retainer 818. As previously mentioned for the right margin stop, this assembly is brazed and pinned to provide a reliable assembly to withstand relatively high impact forces required of margin stops. Three arcuate shaped dogs 822, 824 and 826 are pivotably mounted on pins 768 by apertures 828, 830 and 832 respectively fitting on the larger diameter portions of the pins. These dogs extend counter-clockwise from their pivots, as compared to clockwise for the right margin stop arcuate shaped dogs, and terminate with enlarged cam portions 834, 836 and 838 respectively. The ring shaped base portion 812 of margin stop 810 is positioned against disc shaped portion 764 of spacer 762 having its inside edge 840 exposed to the outside edge 842 of each arcuate shaped dog. A retainer plate 844 has three small apertures 846 that fit over small diameter extensions of the three pins 768 for movably mounting the dogs 822, 824 and 826 and the ring shaped base portion 812 of margin stop 810 on spacer 762. The ends of pins 768 are headed over against plate 844.

The left and right margin stops, therefore, are preassembled in a unit consisting of retainer plate 806, right margin stop 790, spacer 762, left margin stop 810 and retainer plate 844 with the six arcuate shaped dogs retained therein.

A right margin stop carrier 850 is pivotably mounted on extension 724 of function wheel 3 by a bushing 852 rigidly staked to the carrier. Carrier 850 has an arm 854 extending substantially radially outwardly therefrom. Arm 854 is held by right margin stop 790 by being trapped between right margin stop arm 794 and pin 800 for driving margin stop 790 rotationally about the axis of the friction wheel 3, a more detailed description will follow. A left margin stop carrier 856 is pivotably mounted on extension 724 of function wheel 3 having an arm 858 extending substantially radially outwardly therefrom. Arm 858 is held by left margin stop 810 by being trapped between left margin stop arm 814 and pin 820 for driving margin stop 810 rotationally about the axis of the function wheel 3. A torsion spring 860 is connected to a lance 862 in bushing 852 on carrier 850 by an aperture in the spring at its inner end and is connected to a tab 864 formed from carrier 856 by a formed hook 866 at its outer end. As shown in FIGURE 4, spring 860 is sandwiched between carriers 850 and 856 by having carrier 856 positioned against an inner wall 862 of function wheel 3 and having bushing 852 of carrier 850 with spring 860 mounted thereon positioned against carrier 856 while permitting pivotable movement with respect to each other. Spring 860 is tightened around bushing 852 a predetermined about before connecting spring hook 866 on any one of four tabs 864 formed from and equally spaced around carrier 856. This tension on spring 860 constantly biases carrier 850 and therefore right margin stop 790 clockwise about the axis of function wheel 3, viewing FIGURE 13, and constantly biases carrier 856 and therefore left margin stop 810 counter-clockwise about the axis of function wheel 3.

A disc 868 having teeth 870 around the periphery thereof is rigidly mounted on function wheel 3 by four pins 872 (only two shown), FIGURE 4, having a tapered head 874 fitting in a mating tapered aperture 876 in the disc 868. The right margin stop assembly as shown by FIGURE 14 is positioned to have the toothed shaped element 796 engage the teeth 870 of disc 868 having arm 794 on one side of the disc and retainer 798 on the other side of the disc for holding element 796 in radial alignment with the disc. A spring 878, having one end connected to pin 800 and the other end connected to a spring anchor 880 formed from arm 854 of carrier 850 biases element 796 in engagement with teeth 870 of disc 868. The torsional tension of spring 860 tends to bias carrier 850 and margin stop 790 clockwise but spring 878 holds the margin stop in its selected position such as the position shown in FIGURE 19 which defines a carriage stopping position. The left margin stop assembly as shown in FIGURE 15 is positioned to have the toothed shaped element 816 engage the teeth 870 of disc 868 having arm 814 on one side of the disc and retainer 818 on the other side of the disc for holding element 816 in radial alignment with the disc. A spring 882, having one end connected to pin 820 and the other end connected to a spring anchor 884 formed from arm 858 of carrier 856, biases element 816 in engagement with teeth 870 of disc 868. The torsional spring 860 tends to bias carrier 856 and left margin stop 810 counter-clockwise but spring 882 holds the margin stop in its selected position such as the position shown in FIGURE 19 which defines a carriage stopping position.

Referring to FIGURES 19 and 20, an abutment 886 is rigidly brazed on a shaft 888 which is pivotably mounted between back frame 24 and inner back frame 26 having its axis parallel with the axis of the function wheel 3. The right end of abutment 886 has a lower finger 890 extending under a post 892 and has an upper finger 894 extending over post 892 which is rigidly assembled to back frame 24. A spring 896, having one end connected to abutment 886 at aperture 898 and the other end connected to a pin 900 which is rigidly assembled to back frame 24, biases abutment counter-clockwise about shaft 888 to a normal inoperative position determined by finger 890 abutting against post 892. The left end of abutment 886 has an angled edge 902 positioned in the path of edge 904 of left margin stop 810. As the carriage moves toward the left margin, function wheel 3 rotates clockwise (FIGURE 20) until edge 904 of left margin stop 810 contacts edge 902 of abutment 886 and since abutment 886 is prevented from clockwise movement due to post 892, the carriage is stopped thereby establishing the left margin carriage setting.

The left end of abutment 886 has an angled edge 906 positioned in the path of edge 908 of right margin stop 790. As the carriage moves toward the right margin, function wheel 3 rotates counter-clockwise (FIGURE 20) until edge 908 of right margin stop 790 contacts edge 906 of abutment 886 which will pivot abutment 886 clockwise about shaft 888 until finger 894 contacts post 892 thereby establishing a right margin carriage setting. The purpose for the pivoting movement of abutment 886 by the right margin stop 790 is to provide a motion to actuate a line lock mechanism which will be explained later.

The actuation of the left margin stop 810 to vary the left margin position will now be explained. Referring first to FIGURE 12, depressing left margin key 700 pivots key stem 702 counter-clockwise about the axis of aperture 704. Link 706 is pulled forward which pivots bellcrank 710 counter-clockwise about screw 714. Bellcrank 710 then pulls connector 716 toward the left which first takes up the lost motion of elongated aperture 732 and then pivots actuator 720 clockwise about its axis. Actuator 720 has three semi-circular shaped fingers 910 extending parallel to the axis of actuator 720 and inside of the arcuate shaped dogs for the left and right margin stops (FIGURE 16).

As viewed in FIGURE 18, the clockwise movement of actuator 720 causes fingers 910 to contact cam portions 834, 836 and 838 and pivot each dog 822, 824 and 826 radially outwardly about their respective pivot pins 768. Regardless of the circular orientation of the toothed shaped element 816 of left margin stop 810 around the periphery of disc 868, one or two of the dogs (never three) will contact the inside edge 840 of the ring shaped base portion 812 and drive base portion 812 and arm 814 radially outwardly a distance necessary to disengage the toothed shaped element 816 from the teeth 870 of disc 868. In the instance as shown in FIGURE 18, arm 814 is in alignment with arcuate shaped dogs 822 and 826 and due to spring 882 biasing element 816 in engagement with teeth 870, the base portion 812 is slightly off center from the axis of the function wheel and therefore is positioned nearer to dogs 822 and 826 than the other dog 824. Hence it can be seen that there is free space available for dog 824 to be pivoted outwardly by finger 910 without contacting base portion 812 and thus does not interfere with the outward radial movement of arm 814 by dogs 822 and 826.

Now referring to FIGURE 20, with the tooth shaped element 816 disengaged from the teeth 870 of disc 868 by holding left margin key 700 depressed, torsion spring 860 rotates left margin stop 810 clockwise until edge 904 of margin stop 810 contacts edge 902 of abutment 886.

Upon releasing key 700, spring 882 biases element 816 along edge 902 to substantially cam element 816 into engagement with teeth 870 of disc 868. This cam action provides a more efficient and accurate reengagement of the margin stop with the disc 868.

This automatic left margin stop can be adjusted two different ways starting with a normal condition of having the margin stop located on the function wheel such that the carriage is free to move to the extreme left position. One way is to first move the carriage to the desired position and then depress key 700. The margin stop 810 will rotate on the function wheel until it contacts abutment 886 and when key 700 is released, the margin stop 810 will reengage the function wheel at the setting which coincides with the position of the carriage. The second way is to first depress key 700, the margin stop 810 will rotate on the function wheel until it contacts abutment 886, then move the carriage to the desired position. The margin stop will remain biased against abutment 886 during this carriage movement even though the function wheel is rotating. When the carriage is positioned, the key 700 is released and the margin stop 810 will reengage the function wheel for the new left margin position.

The actuation of the right margin stop 810 to vary the right margin position will now be explained. Referring again to FIGURE 12, depressing the right margin key 734 pivots key stem 736 counter-clockwise about the axis of aperture 738. Link 740 is pulled forward which pivots bellcrank 744 clockwise about screw 748. Bellcrank 744 then pulls connector 750 toward the right which first takes up the lost motion of elongated aperture 754 and then pivots actuator 720 counter-clockwise about its axis.

As viewed in FIGURE 17, the counter-clockwise movement of actuator 720 causes fingers 910 to contact cam portions 774, 780 and 786 and pivot each dog 770, 776 and 782 radially outwardly about their respective pivots 768. Regardless of the circular orientation of the toothed shaped element 796 of right margin stop 790 around the periphery of disc 868, one or two of the dogs (never three) will contact the inside edge 802 of the ring shaped base portion 792 and drive base portion 792 and arm 794 radially outwardly a distance necessary to disengage the tooth shaped element 796 from the teeth 870 of disc 868. In the instance as shown in FIGURE 17, arm 794 is in alignment with arcuate shaped dog 782 and due to spring 878 biasing element 796 in engagement with teeth 870, the base portion 792 is slightly off center from the axis of the function wheel and therefore is positioned nearer dog 782 than the other two dogs 770 and 776. Hence it can be seen that there is free space available for dogs 770 and 776 to be pivoted outwardly by fingers 910 without contacting base portion 792 and thus does not interfere with the outward radial movement of arm 794 by dog 782.

Referring again to FIGURE 20, with the tooth shaped element 796 disengaged from the teeth 870 of disc 868 by holding right margin key 734 depressed, torsion spring 860 rotates right margin stop 790 counter-clockwise until edge 908 of margin stop 790 contacts edge 906 of abutment 886. Spring 896 has greater tension than the torsion spring 860, therefore the impact of margin stop 790 contacting abutment 886 does not pivot the abutment. Upon releasing key 734, spring 878 biases element 796 along edge 906 to substantially cam element 796 into engagement with teeth 870 of disc 868. As mentioned for the left margin stop, this cam action provides a more efficient and accurate reengagement of the margin stop with the disc 868. The automatic right margin stop can be adjusted by either of the same two ways as described for the left margin stop.

Thus it has been shown that the present invention includes: a function wheel sufficiently small to accommodate a standard size portable typewriter; a left and right margin stop adjustably mounted for automatic setting on the function wheel; and keyboard control means for actuating the margin stops.

*Line lock and margin release*

A line lock is a mechanism generally actuated by a right margin stop to block the printing action and prevent a type bar from striking the platen at the end of a line of write. A margin release is a feature to release the line lock mechanism allowing printing beyond the margin stop setting.

The F. F. Anderson Patent 640,254 discloses a line lock and margin release means actuated by a rotatably adjustable margin stop engageable with a wheel shaped member. One disadvantage of this patent over the present invention is that this patent provides for a maximum of three letter spaces when releasing the line lock for completing a word or syllable regardless of the letter spaces remaining in the carriage length. Whereas in the present invention, releasing the line lock frees the carriage for all of the letter spaces remaining in the carriage length. Another disadvantage of the Anderson patent is that the margin release key is located at the extreme back of the machine which is a very inconvenient and undesirable location. In the present invention the margin release key is convennently located on the keyboard adjacent the regular keys (FIGURE 2).

Referring to FIGURE 19, as the carriage advances in the letter feed direction during regular printing actions, the function wheel 3 carries the right margin stop 790 counter-clockwise until the margin stop contacts and pivots abutment 886 clockwise about shaft 888 to a limited position determined by finger 894 abutting post 892. The amount of movement of abutment 886 is preferably a small fraction less than one space. An arm 920 has its rearward end rigidly assembled to a support 922 formed from abutment 886 by a screw 924 and by a finger 926 extending into aperture 928. A link 930 has one end connected to the forward end of arm 920 and has the other end connected to a lock 932. Lock 932 is pivotably mounted on a bracket 934 which is rigidly assembled to a frame member (not shown) by a shouldered screw 936.

The clockwise movement of abutment 886 pivots arm 920 in an arcuate path about the axis of shaft 888 which drives link 930 toward the left. Link 930 pivots lock 932 counter-clockwise about screw 936 which positions a tab 938 formed downward from lock 932 in the path of a finger 940 extending downward from the universal bar 146. The universal bar 146 normally drives toward the rear of the machine each time a printing key action is actuated to trip the escapement and to allow a type bar to strike the platen. With the tab 938 in the path of finger 940, the universal bar 146 is blocked from its normal movement thereby preventing the type bar from striking the platen and preventing the escapement from tripping which is commonly referred to as a line lock.

If it is desirable to print one or more characters beyond the line lock position, a margin release key 942 (FIGURE 2) may be depressed. The margin release key 942 is connected to a link 944 (FIGURE 19) by any conventional key stem and bellcrank linkage (not shown). Link 944 is pivotably connected at the right end of a bellcrank 946 by a shouldered pin 948. Bellcrank 946 is pivotably mounted on back frame 24 by a shouldered screw 950. The left end of bellcrank 946 has an ear 952 formed downward for contacting the rearward side of abutment 886. The depression of margin release key drives link 944 rearward which pivots bellcrank 946 counter-clockwise about screw 950. This movement of bellcrank 946 causes ear 952 to move forward, contact abutment 886, and (since abutment 886 is rigidly assembled to shaft 888) drive abutment 886 and shaft 888 forward longitudinally along the axis of the shaft. Shaft 888 has smaller diameter portions extending in frame members 24 and 26 of sufficient length to permit the axial movement of the shaft. The forward movement of abutment 886 moves edge 906 forward and out of the path of edge 908 of right margin stop 790. Margin release key 942 may now be released. Spring 896 is free to bias abutment counter-clockwise about shaft 888 to its normal position determined by finger 890 abutting against post 892. The return movement of abutment 886 pivots arm 920 upward which pulls link 930 toward the right. Link 930 pivots lock 932 clockwise about screw 936 which removes tab 938 from the path of finger 940 of universal bar 146. The key action is now free for normal typing and the function wheel 3 will continue to carry the margin stop 790 counter-clockwise (FIGURES 19 or 20) beyond abutment 886 and continuous typing is permitted until the carriage 2 moves to its full length to the end of the line of write.

As soon as margin stop 790 is carried beyond abutment 886 after depression of the margin release key 942, spring 896 not only biases abutment 886 counter-clockwise but also biases abutment 886 and shaft 888 axially rearward to its normal inoperative position. When the operator has completed the typing beyond the right margin and when the carriage is moved to the left to start a new line of write, the function wheel 3 rotates clockwise (FIGURE 19 or 20), a finger 954 formed from retainer 798, which is assembled to margin stop 790, contacts abutment 886 and cams the abutment and shaft 888 axially forward to permit the margin stop 790 to return to the normal side of abutment 886.

When the carriage is moved to the extreme left margin stop position which is determined by left margin stop 810 abutting against the upper edge 902 of abutment 886 and on occasion when the operator wished to type to the left beyond the left margin stop, depressing the margin release key 942 will move abutment 886 forward in the same manner previously described and the carriage can be moved further to the left. Typing may start to the left of the margin stop setting, which rotates function wheel 3 counter-clockwise, and may continue through the margin stop setting without linelock interruption. This is accomplished by a finger 956 formed from retainer 818, which is assembled to the left margin stop 810, that contacts abutment 886 and cams the abutment and shaft 888 axially forward but does not pivot the abutment and therefore does not actuate the line lock mechanism. The forward displacement of abutment 886 allows the function wheel 3 to carry the left margin stop 810 counter-clockwise (FIGURE 19 or 20) through the margin setting position and to the normal typing area. Again spring 896 biases abutment 886 and shaft 888 axially rearward to its normal inoperative position.

When normal typing has caused right margin stop 790 to pivot abutment 886 and actuate the line lock mechanism to prevent further typing, merely returning the carriage to the left by the linespace lever 48 pivots the function wheel 3 clockwise which carries margin stop 790 away from abutment 886. Spring 896 again biases abutment 886 to its normal inoperative position which releases the line lock mechanism freeing the key action for normal typing.

*Right margin bell*

A right margin bell provides a warning for the operator of the oncoming right margin stop, generally four to eight spaces in advance. For typewriters having conventional automatic margin adjusting means, such as spring biased margin stops, the bell rings each time the right margin is adjusted (provided it is more than an eight space adjustment) which is an additional, unnecessary and annoying bell ringing. This is particularly annoying where several machines are located in one office area. An example of a right margin bell of this type is shown by W. F. Helmond Patent 2,650,687 for Stop Positioning Mechanism for Typewriters issued September 1, 1953.

The F. F. Anderson Patent 640,254 discloses a right margin bell means associated with a wheel shaped member having a rotatably adjustable right margin stop. Since this margin stop is not automatically adjustable, it is less pertinent to the present invention than the exemplified Helmond patent.

It is therefore the object of the present invention to provide a right margin bell means that will not ring the bell when adjusting the right margin stop in a machine having automatically adjustable margin stops. This eliminates the annoying additional bell ringing that is inherent in the conventional automatic adjustable margin stop machines.

Referring to FIGURES 19 and 20, a bell carrier 960 is pivotably mounted on back frame 24 by a screw 962. An arm 964 is rigidly assembled at its left end to a tab 966 formed from carrier 960 and has a weight 968 rigidly assembled at its right end. A spring 970 is connected at one end to a spring anchor 972 formed from carrier 960 and is connected at the other end to inner back frame 26. Spring 970 biases carrier 960 counter-clockwise about screw 962 to a limited position determined by an ear 974 formed from carrier 960 abutting against a frame member (not shown). An actuator 976 is pivotably and slidably mounted on carrier 960 by a shouldered pin 978 extending through an elongated aperture 980 in actuator 976. A spring 982 is connected at one end to a spring anchor 984 formed from actuator 976 and is connected at the other end to a spring anchor (not shown). Spring 982 is orientated to bias actuator 976 clockwise about pin 978 to a limited position determined by anchor 984 of actuator 976 abutting against the top edge of an arm 986 of carrier 960 and to bias actuator 976 toward the left to a limited position determined by the end of elongated aperture 980 abutting against pin 978. Actuator 976 has an ear 988 formed therefrom at the left end which is normally in a position to be contacted by the extreme end of arm 854 of carrier 850. A bell 990 is rigidly assembled to right side frame 22 by a pair of screws 992. It is to be noted that the extreme end of arm 858 of left margin carrier 856 is slightly shorter than right margin carrier 850 to prevent the left margin from being able to actuate the right margin bell.

As the carriage nears the right margin during normal typing, function wheel 3 rotates counter-clockwise carrying right margin stop 790 therewith causing arm 854 of carrier 850 to contact ear 988 of actuator 976 and to lift the actuator upwardly. Being anchor 984 of actuator 976 is biased against carrier 960, the upward movement of actuator 976 pivots carrier 960 clockwise about screw 962 which carries weight 968 downward a predetermined distance away from bell 990. Continuous movement of margin stop 790 drives actuator 976 upward and around screw 962 such that ear 988 rides off the end of arm 854. Spring 970 now biases carrier 960 counter-clockwise to its rest position causing weight 968 to strike bell 990. Actuator 976 is also returned to its normal inoperative position shown by FIGURE 20.

When the carriage is returned to the left for a new line of write, function wheel 3 carries right margin stop 790 clockwise and again arm 854 will contact ear 988 of actuator 976 but it is now desirable to prevent the bell from ringing. This is accomplished by arm 854 pivoting actuator 976 clockwise about pin 978 against the tension of spring 982 which does not pivot carrier 960 and therefore does not ring the bell. When arm 854 has traveled beyond actuator 976, spring 982 will bias the actuator to its normal inoperative position.

It is also desirable to prevent the bell from ringing when adjusting the right margin stop. It is inherent in the conventional automatic margin means for the right margin stop to trip the bell mechanism as it moves to the carriage abutment when adjusting the right margin setting. As previously mentioned, this is an additional and annoying ringing of the bell. This additional ringing of the bell is prevented in the present invention simply and efficiently. When the right margin key 734 is depressed, connector 750 is pulled toward the right (FIGURE 20) causing an upstanding finger 994 extending from connector 750 to contact anchor 984 of actuator 976 and pull actuator 976 toward the right without disturbing carrier 960 by aperture 980 sliding along pin 978. The rightward movement of actuator 976 removes ear 988 out of the path of arm 854 of right margin stop 790 which allows the margin stop to rotate past the bell mechanism to abutment 886 without ringing the bell. Upon releasing right margin key 734, connector 750 returns to the left to its inoperaitve position and spring 982 biases actuator 976 to the left to its inoperative position.

*Summary*

It can now be seen that the present function wheel having all of the major typewriter features directly operative therewith has provided the many advantages previously described for controlling the movement of the carriage which substantially improves the performance and reliability of a typewriter.

The invention may be embodied in other specific forms without departing from the spirit or essential characteristics thereof.

The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a typewriter, a work sheet support carriage, means mounting said carriage for rectilinear movement along a predetermined path in both the letter space and return directions, means urging said carriage in the letter space direction, a rotary carriage control assembly, means drive connecting said assembly to said carriage for concomitant rotary and rectilinear motions respectively, and key actuated means for controlling the rotary motion of said assembly under the influence of said urging means, said last named means comprising:
   (a) a key controlled escapement mechanism connected to said rotary assembly and actuatable to permit letter space movements of said carriage incident to key actuation;
   (b) a tabulation mechanism including at least one annular row of selectively settable tab stops on said assembly and concentric with the rotation axis thereof and a key actuated counter stop mounted for movement in response to key actuation into the path of movement of the set ones of said tab stops; and
   (c) a selectively settable margin stop on said assembly and an abutment disposed in the path of rotation thereof and engageable thereby for determining the limit of rotation of said assembly in the return direction of said carriage, said margin stop being structurally independent of and settable independently of said tab stops.

2. In a typewriter as defined in claim 1 wherein said assembly further has a washer shaped recess therein extending around the axis thereof and wherein said urging means includes a spring mounted in said recess having one end connected to a rigid member and the opposite end connected to said assembly for biasing said assembly rotationally relative to said rigid member.

3. In a typewriter as defined in claim 1 wherein said drive connecting means includes a flexible member operatively fixed to said carriage and said assembly.

4. In a typewriter as defined in claim 3 further comprising means for adjustably positioning said carriage relative to said flexible member to fixedly locate said carriage relative to said assembly.

5. In a typewriter as defined in claim 1 wherein said carriage has spaced apart end frames and said assembly having a portion thereof extending into the space defined by projecting one of said end frames to the other thereby providing vertical and horizontal compactness to the typewriter.

6. A typewriter as defined in claim 1 wherein said escapement mechanism includes means for full drop incremental letter space movements.

7. A typewriter as defined in claim 1 wherein said rotary carriage control assembly includes a main body portion for supporting said key actuated means, said body portion being made of synthetic material.

8. A typewriter as defined in claim 1 further comprising back spacing means operatively connected to said escapement mechanism for incrementally spacing said carriage in the return direction.

9. A typewriter as defined in claim 1 further comprising means operatively connected to said escapement mechanism for releasing said escapement from control of said assembly whereby said urging means will move said carriage in the letter space direction and means operable for arresting said assembly and thereby arresting said carriage after it has moved a fraction of a letter space in the letter space direction.

10. A typewriter or the like comprising:
 (a) a framework;
 (b) a work sheet supporting carriage movably mounted on said framework;
 (c) a carriage movement control member rotatably mounted on said framework;
 (d) means connecting said control member to said carriage;
 (e) tabulator means operatively connected to said control member for stopping said carriage in selected letter space positions comprising:
  (1) a plurality of tab stops mounted in at least two annular rows in said control member, one row being circumferentially shifted with respect to the other row by a distance less than the distance between adjacent pins in one row, and displaceable from clear to set and set to clear positions respectively; and
  (2) key actuated counter stop means movable into position to be engaged by a set tab stop in either of said rows to determine a distinct angular position of said control member thereby determining a letter space position of said carriage.

11. A typewriter as defined in claim 10 wherein said tabulator means includes key operable linkage having a tab stop set arm capable of displacing a single tab stop to a set position in any one of said annular rows.

12. A typewriter as defined in claim 10 wherein said tabulator means includes key operable linkage having a tab stop clear arm capable of displacing a single tab stop to a clear position in any one of said annular rows.

13. A typewriter as defined in claim 10 wherein said tabulator means includes key operable linkage having a tab stop set arm operable to displace a tab stop to a set position, a tab stop clear arm operable to displace a tab stop to a clear position and a common actuator for actuating said set arm and said clear arm.

14. A typewriter as defined in claim 10 further comprising an escapement mechanism operatively connected to said control member for controlling incremental stepping movements of said carriage in the letter feed direction.

15. A typewriter as defined in claim 14 wherein said key actuated counter stop means includes means operable to disengage said escapement mechanism from control of said control member during positioning of said counter stop means for engagement by a set tab stop.

16. A typewriter as defined in claim 10 wherein said key actuated counter stop means includes an individual counter stop member for each of said annular rows positionable to be engaged by a set tab stop.

17. A typewriter as defined in claim 16 wherein said key actuated counter stop means further includes means operable for simultaneously positioning each counter stop member into the path of a set tab stop in each of said annular rows.

18. A typewriter as defined in claim 10 further comprising at least one indirectly adjustable margin stop mounted on said control member and an abutment disposed in the path of rotation thereof for determining a limit of rotation of said control member and the concomitant movement of said carriage.

19. A typewriter or the like comprising a carriage and means for limiting the travel of said carriage comprising a rotatable control member operatively connected thereto and means including at least one indirectly adjustable margin stop mounted on said control member for circumferential adjustment to any one of a plurality of carriage positions for stopping said control member in a preselected angular position to limit the rotation of said control member and the concomitant movement of said carriage.

20. A typewriter as defined in claim 19 further comprising means for disengaging said margn stop from and then moving said margin stop angularly relative to said control member to vary said limit of carriage travel.

21. A typewriter as defined in claim 19 further comprising means for automatically moving said margin stop angularly relative to said control member when disengaged therefrom to a predetermined position to vary said limit of carriage travel.

22. A typewriter as defined in claim 21 wherein said automatic means includes a spring operatively connected to said margin stop.

23. A typewriter as defined in claim 19 wherein said control member stopping means includes an abutment disposed in the path of said margin stop and engageable thereby for limiting the rotation of said control member.

24. A typewriter as defined in claim 23 further comprising means operable to shift said abutment out of engagement with said stop to permit said carriage to be moved beyond the limit position determined by said margin stop.

25. A typewriter as defined in claim 24 wherein said shifting means comprises selectively actuatable keyboard control means and linkage means operatively connected between said control means and said abutment.

26. A typewriter as defined in claim 23 further comprising biasing means operable to automatically move said margin stop relative to said control member and in cooperation with said abutment to vary said limit of carriage travel.

27. A typewriter as defined in claim 19 further comprising a second keyboard selectable adjustable margin stop mounted on said control member for circumferential adjustment to any one of a plurality of carriage positions for limiting the rotation of said control member in a direction opposite to said first mentioned keyboard selectable adjustable margin stop and a spring interconnecting each of said margin stops for automatically moving each of said margin stops relative to said control member upon disengagement therefrom to vary said limit of carriage travel in a letter space and a return direction.

28. A typewriter as defined in claim 19 further comprising biasing means for normally holding said margin stop in engagement with said control member.

29. A typewriter as defined in claim 28 further comprising means for moving said margin stop radially relative to said control member against the effect of said biasing means for disengaging said margin stop therefrom to permit adjusting said margin stop angularly relative to said control member.

30. A typewriter as defined in claim 19 further comprising a carrier rotatably mounted on said control member and connected to said margin stop and biasing means connected to said carrier for moving said margin stop angularly relative to said control member when disengaged therefrom to vary said limit of carriage travel.

31. A typewriter as defined in claim 19 further comprising a key controlled escapement mechanism operatively connected to said control member for controlling incremental stepping movements of said carriage in a letter feed direction.

32. A typewriter as defined in claim 19 further comprising a key controlled tabulator means operatively connected to said control member for stopping said carriage in selected carriage positions.

33. A typewriter as defined in claim 19 further comprising a signal means mounted to be actuated by said margin stop near the limit of carriage movement in a letter space direction when said margin stop is carried by said control member and means for disabling said signal means when circumferentially adjusting said margin stop relative to said control member.

References Cited by the Examiner
UNITED STATES PATENTS

| | | | |
|---|---|---|---|
| 632,136 | 8/1899 | Moore | 197—6.4 |
| 640,254 | 1/1900 | Anderson | 197—60 |
| 1,054,875 | 3/1913 | Smith | 197—179 |
| 1,530,885 | 3/1925 | Jardins | 197—64 |
| 1,820,329 | 8/1931 | Seidelinger | 197—82 |
| 2,277,277 | 3/1942 | Tombolini | 197—179 X |
| 2,397,578 | 4/1946 | Turquand | 197—63 |
| 2,439,470 | 4/1948 | Jackson | 197—84.3 X |
| 2,517,306 | 8/1950 | Gustavson et al. | 197—179 |
| 2,649,179 | 8/1953 | Barkdoll | 197—88 |
| 2,805,749 | 9/1957 | Kleinschmidt | 197—179 |
| 2,879,876 | 3/1959 | Palmer et al. | 197—16 |
| 3,045,798 | 7/1962 | Lambert et al. | 197—84.3 |
| 3,093,230 | 6/1963 | Byers | 197—62 X |

ROBERT E. PULFREY, *Primary Examiner.*

E. S. BURR, *Assistant Examiner.*